(12) United States Patent
Nault

(10) Patent No.: US 7,139,729 B2
(45) Date of Patent: Nov. 21, 2006

(54) FINANCIAL STATEMENT MODULE

(76) Inventor: Jacques Nault, 1301 Reid, St-Athanase, Quebec (CA) J2X 2W3

( * ) Notice: Subject to any disclaimer, the term of this patent is extended or adjusted under 35 U.S.C. 154(b) by 173 days.

(21) Appl. No.: 09/736,345

(22) Filed: Dec. 15, 2000

(65) Prior Publication Data

US 2001/0044762 A1 Nov. 22, 2001

Related U.S. Application Data

(60) Provisional application No. 60/172,587, filed on Dec. 20, 1999.

(51) Int. Cl.
*G07B 17/00* (2006.01)
*G07F 17/00* (2006.01)

(52) U.S. Cl. .......................... 705/30; 705/31
(58) Field of Classification Search ................. 705/30
See application file for complete search history.

(56) References Cited

U.S. PATENT DOCUMENTS

| | | | | |
|---|---|---|---|---|
| 3,610,902 A | * | 10/1971 | Rahenkamp et al. | 708/174 |
| 4,642,767 A | * | 2/1987 | Lerner | 705/30 |
| 5,390,113 A | * | 2/1995 | Sampson | 705/30 |

OTHER PUBLICATIONS

"Peachtree: Using General Ledger", 1989, Peachtree Software, First Edition.*

Best Software SB. Inc., Peachtree—Get the Insight Behind Your Number, printed on Jan. 20, 2005 from http://www.peachtree.com/peachtreeaccountingline/, 1 page.

Financial Microsystems, Inc., Client Ledger System™ Basic Features, printed on Jan. 20, 2005 from http://info.clientledgersystem.com/clsbasicfeatures.htm, 4 pages.

Intuit Inc., Solutions for Accounting Professionals, printed on Jan. 20, 2005 from http://accountant.intuit.com/products_services/quickbooks_premier_accountant_edition/index.aspx, 2 pages.

* cited by examiner

*Primary Examiner*—James A. Kramer
(74) *Attorney, Agent, or Firm*—Maine & Asmus

(57) ABSTRACT

A financial statement module is provided in which information concerning transactions is stored efficiently in order to produce small files and be able to store a large quantity of transaction information. Using the distinction and processing done to the two types of balances appearing in the financial statement, the module can produce any type of financial statements, independently of the type of business, report, accounting system or information. The generator can produce a detail for a financial statement item, for an account balance, for a document, and build any transactions report. Using the financial statements created, anyone can evaluate the economical performance of the individual or business concerned because the emphasis of the report is chosen by the user without any conventional frameworks, and perform verification work.

44 Claims, 26 Drawing Sheets

FIGURE 1

Demo Compagny

TRIAL BALANCE as at June 30, 1999

|  | DEBIT | CREDIT |
|---|---|---|
| 0 Cash | 254.27 | |
| 1 Bank-current | 2 853.74 | |
| 5 Credit card | | 400.62 |
| 100 Accounts receivable | 1 200.30 | |
| 200 Inventories | 3 468.00 | |
| 500 Fixed assets | 10 000.00 | |
| 505 Accrued dep. | | 1 500.00 |

Demo Compagny

BALANCE SHEET as at June 30, 1999

ASSETS

Current assets
- Cash — 2 707.39
- Accounts receivable — 1 200.30
- Inventories — 3 468.00
- — 7 375.69

Fixed assets — 8 500.00

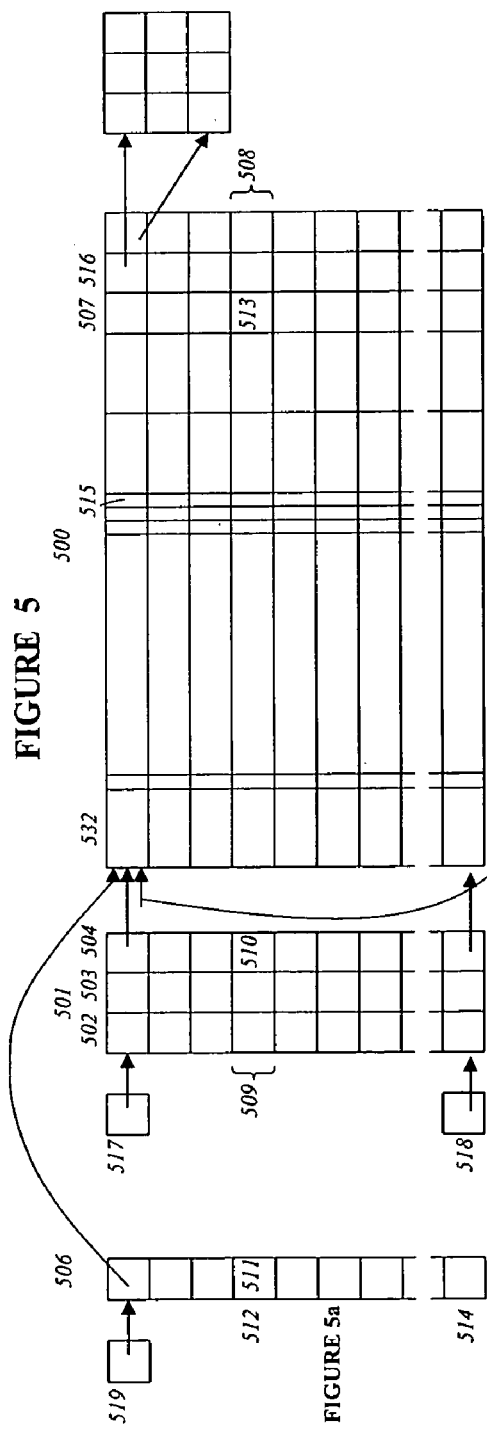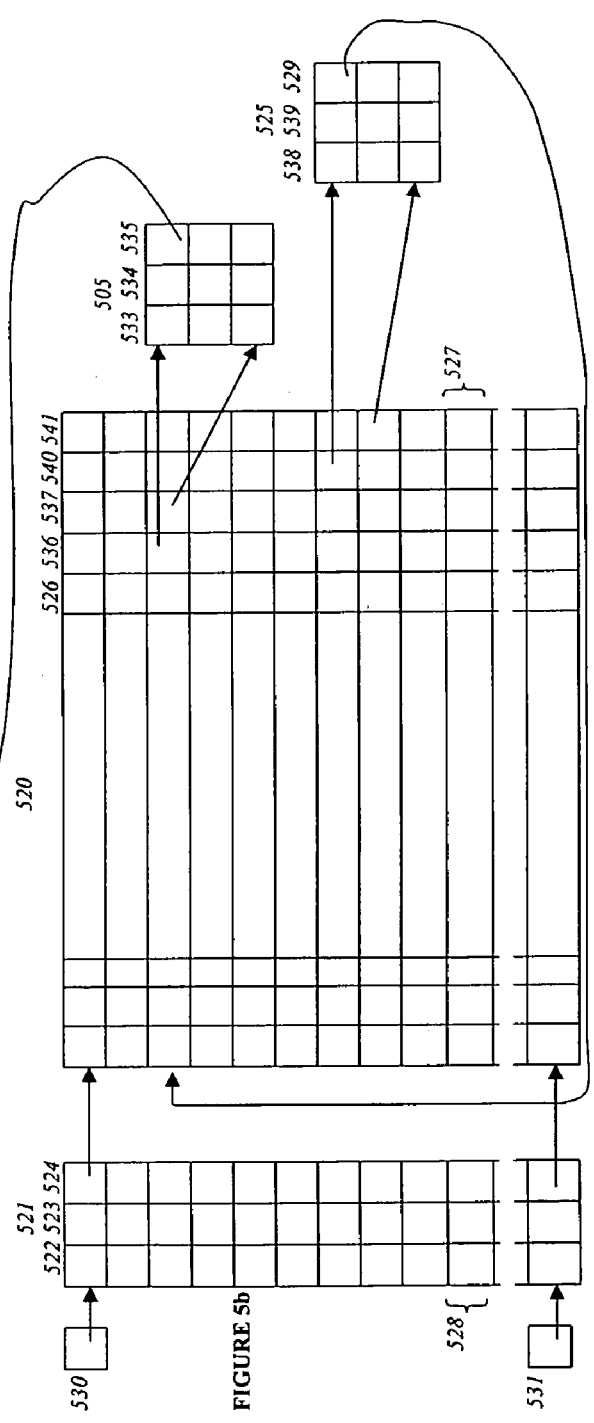
FIGURE 5

MASTR.DAT

| | | |
|---|---|---|
| biggest_link | : | 40 — 1101 |
| nbr_accts | : | 40 |
| nbr_trans | : | 113 — 1102 |
| carryover_date | : | 730 |
| closing_date | : | 729039 |
| password | : | |
| company_name | : | DEMO COMPANY |
| attribut | : | 7 |
| drive_DAT | : | |
| drive_BCK | : | |
| drive_HIS | : | |
| nbr_files_his | : | 0 — 1103 |

FIGURE 12

CHART.DAT 1201

| | | | | | | |
|---|---|---|---|---|---|---|
| .....0 , | Petty cash | B , | b , | 0.00 , | 0.00 , | 1 |
| .....1 , | Bank | B , | b , | 0.00 , | 0.00 , | 2 |
| ...10 , | Credit card | B , | b , | 0.00 , | 0.00 , | 3 |
| .100 , | Accounts receivable | B , | b , | 0.00 , | 0.00 , | 4 |
| .105 , | C.T.I. | D , | b , | 0.00 , | 0.00 , | 5 |
| .106 , | R.T.I. | D , | b , | 0.00 , | 0.00 , | 6 |
| .200 , | Inventories | D , | b , | 0.00 , | 0.00 , | 7 |
| .500 , | Computer | D , | b , | 0.00 , | 0.00 , | 8 |
| .505 , | Accrued dep.-computer | D , | b , | 0.00 , | 0.00 , | 9 |
| .600 , | Accounts payable | B , | b , | 0.00 , | 0.00 , | 10 |
| .605 , | T.P.S. payable | C , | b , | 0.00 , | 0.00 , | 11 |
| .606 , | T.V.Q. payable | C , | b , | 0.00 , | 0.00 , | 12 |
| .607 , | Taxes - net amount | C , | b , | 0.00 , | 0.00 , | 13 |
| .700 , | Loan | C , | b , | 0.00 , | 0.00 , | 14 |
| .990 , | Capital stock | C , | b , | 0.00 , | 0.00 , | 15 |
| .999 , | Retained earnings | C , | b , | 0.00 , | 34733.00 , | 16 |
| 1000 , | Sales - product 1 | C , | & , | 0.00 , | -90000.00 , | 17 |
| 1010 , | Sales - product 2 | C , | & , | 0.00 , | -70000.00 , | 18 |
| 1020 , | Sales - product 3 | C , | & , | 0.00 , | -30000.00 , | 19 |
| 2000 , | Purchases - product 1 | D , | & , | 0.00 , | 50000.00 , | 38 |
| 2010 , | Purchases - product 2 | D , | & , | 0.00 , | 20000.00 , | 39 |
| 2020 , | Purchases - product 3 | D , | & , | 0.00 , | 10000.00 , | 40 |
| 2090 , | Changes in inventory | D , | & , | 0.00 , | 0.00 , | 20 |
| 3000 , | Travel charges | D , | & , | 0.00 , | 4500.00 , | 21 |
| 3200 , | Sale charges | D , | & , | 0.00 , | 1250.00 , | 22 |
| 3500 , | Advertising | D , | & , | 0.00 , | 9000.00 , | 23 |
| 3600 , | Promotion | D , | & , | 0.00 , | 1000.00 , | 24 |
| 5000 , | Salaries | D , | & , | 0.00 , | 37500.00 , | 25 |
| 5050 , | Insurances | D , | & , | 0.00 , | 520.00 , | 26 |
| 5100 , | Rent | D , | & , | 0.00 , | 9000.00 , | 27 |
| 5200 , | Electricity | D , | & , | 0.00 , | 1500.00 , | 28 |
| 5300 , | Telephone | D , | & , | 0.00 , | 1950.00 , | 29 |
| 5400 , | Stamps | D , | & , | 0.00 , | 570.00 , | 30 |
| 5500 , | Office stationery | D , | & , | 0.00 , | 525.00 , | 31 |
| 5600 , | Capital taxe | D , | & , | 0.00 , | 202.00 , | 32 |
| 5900 , | Depreciation - computer | D , | & , | 0.00 , | 100.00 , | 33 |
| 7900 , | Bank charges | D , | & , | 0.00 , | 150.00 , | 34 |
| 7910 , | Interests | D , | & , | 0.00 , | 0.00 , | 35 |
| 8000 , | Other income | D , | & , | 0.00 , | 0.00 , | 36 |
| 9000 , | Income taxes | D , | & , | 0.00 , | 7500.00 , | 37 | nbr of records : 40

FIGURE 13

FINANCIAL STATEMENT FILE

```
                                    1301
                                     | 1302
                                     |  | 1303
                                     |  |  | 1304
 1.  9c            ASSETS......... 2 .|  |  |  |
 1. 10c  Current assets........... 2 .
 1. 11i    Cash................... 0 ,  1,  2,  3, 32767.
                                                         1305
 1. 12i    Accounts receivable.... 0 ,  4, 32767.
                                                              1306
 1. 13i    Inventories............ 0 ,  7, 32767.
 1. 14   ----------------......... 3 .
 1. 15t  ......................... 1 ,  1,   4,   7, 32767.          1308
 1. 16c  ......................... 2 .                               1307
 1. 17i  Fixed assets............. 0 ,  8,  9, 32767.
 1. 18   ----------------......... 3 .
 1. 19t  ......................... 1 ,  1,  4,   7,   8, 32767.
 1. 20   ================......... 5 .
 1. 21c  ......................... 2 .
 1. 22c           LIABILITIES.... 2 .
 1. 23c  Current liabilities...... 2 .
 1. 24c    Accounts payable....... 2 .
 1. 25i    and accrued charges.... 0 , 11, 12, 13, 15,  6, 10, 32767.
 1. 26c  ......................... 2 .
 1. 27i  Loan..................... 0 , 14, 32767.
 1. 28   ----------------......... 3 .
 1. 29t  ......................... 1 , 11, 14, 32767.
 1. 30   _____................. 4 .
 1. 31c  ......................... 2 .
 1. 32c           EQUITY......... 2 .
 1. 33i  Capital stock............ 0 , 15, 32767.
 1. 34i  Retained earnings........ 0 , 16, 32767.
 1. 35i  Net income............... 0 , 17, 18, 19, 38, 39, 40, 20, 21, 22, 23.
 24, 25, 26, 27, 28, 29, 30, 31, 32, 33, 34, 35, 36, 37, 32767.
 1. 36   ----------------......... 3 .
 1. 37t  ......................... 1 , 15, 16, 17, 32767.
 1. 38   _____................. 4 .
 1. 39c  ......................... 2 .
 1. 40t  ......................... 1 , 11, 14, 15, 16, 17, 32767.
 1. 41   ================......... 5 .
```

FIGURE 18

Demo Company

BALANCE SHEET as at June 30, 1999

ASSETS

| | |
|---|---:|
| Current assets | 2 707.39 |
|     Cash | 1 231.96 |
|     Accounts receivable | 3 468.00 |
|     Inventories | --------------- |
| | 7 407.35 |
| Fixed assets | 8 500.00 |
| | --------------- |
| | 15 907.35 |
| | ======== |

LIABILITIES

| | |
|---|---:|
| Current liabilities | |
|     Accounts payable | 833.62 |
| Loan | 6 000.00 |
| | --------------- |
| | 6 833.62 |

EQUITY

| | |
|---|---:|
| Capital stock | 1 000.00 |
| Retained earnings | (2 019.56) |
| Net income | 10 093.29 |
| | --------------- |
| | 9 073.73 |
| | --------------- |
| | 15 907.35 |
| | ======== |

Demo Compagny

BALANCE SHEET as at June 30, 1999

ASSETS

Current assets
Cash                    2 707.39
Accounts receivable     1 200.30
Inventories             3 468.00
                        ────────
                        7 375.69

Fixed assets            8 500.00
                        ────────
                        15 875.69
                        ========

FIGURE 19b

Demo Compagny

BALANCE SHEET as at June 30, 1999

ASSETS

Current assets
Cash                      254.27
Bank - current          2 853.74
Credit card              (400.62)
Accounts receivable     1 200.30
Inventories             3 468.00
                        ────────
                        7 375.69

Fixed assets           10 000.00
Accrued dep.           (1 500.00)
                        ────────
                        15 875.69
                        ========

```
                        Demo Company account balance detail                    ──── 2005 from June 1 1999 to June 30 1999
                                                                ──── 2006
2008 ──── 80- TPS receivable       Dr   Balance carried over     0.00+D Date   Docum   Acct      Description        Amount   ──── 2004
        ┌                                                       ──── 2003
2009    │ 1/06/99  102     1       XYZ company         20.86+D  ◄── 2001
        └ 1/06/99  101     80      ref: general journal 10.80+D
                                                                ──── 2007
              Balance as at 30/06/1999                 31.66+D  ◄── 2002
                                                       =====
```

FIGURE 21 document detail

1 Bank - current

| Date | Docum | Acct | Description | Amount |
|------|-------|------|-------------|--------|
| 30/06/99 | 102 | 2000 | xyz entreprise | 199.00 |
| 30/06/99 | 102 | 2010 | xyz entreprise | 74.25 |
| 30/06/99 | 102 | 2020 | xyz entreprise | 24.75 |
| 30/06/99 | 102 | 680 | xyz entreprise | 20.86 |

Total document # 102    318.86 — 2101

2102 — 1 Bank - current
2103 — Date column
2104 — Docum column
2105 — Acct column

FIGURE 25

1 Bank - current — 2504

30/06/99 — 2509

| Date | Docum | Acct | Description | Amount | + | − |
|------|-------|------|-------------|--------|---|---|
| 30/06/99 | 102 | 2000 | xyz entreprise | 199.00 | | |
| 30/06/99 | 102 | 2010 | xyz entreprise | 74.25 | | |
| 30/06/99 | 102 | 2020 | xyz entreprise | 24.75 | | |
| 30/06/99 | 102 | 680 | xyz entreprise | 20.86 | | |
| 30/06/99 | 993006 | 0 | cash deposit | | 1 000.00 | |
| 30/06/99 | 103 | 5060 | supplier 2 | | | 154.25 |

Book balance :     2 853.74 — 2503
+ cheques o/s:       165.05 — 2505
− deposit o/s:     1 000.00 — 2506
Bank statement:    2 018.79 — 2507

Total document #  102  :  318.86
                          318.86 — 2508

Demo Compagny
BALANCE SHEET
as at June 30, 1999

ASSETS

| | Loan 1 | |
|---|---|---|
| 7.00 | | |
| 990 | Capital stock | |
| 999 | Retained earnings | |
| 1000 | Sales - product 1 | |
| 1010 | Sales - product 2 | |
| 1020 | Sales - product 3 | |
| 2000 | Purchases - product 1 | |
| 2010 | Purchases - product 2 | |
| 2020 | Purchases - product 3 | |
| 2900 | Changes in inventory | |
| 3000 | Advertising - promotion | |
| 3010 | Entertainment expenses | |

Current assets
  Cash
  Accounts receivable
  Inventories

Fixed assets                                    15 907.35

LIABILITIES

Current liabilities
  Accounts payable                                 833.62
  Loan FIGURE 26a

| | Cash | Accounts receivable |
|---|---|---|
| 1 12 i | Inventories | |
| 1 13 i | | |
| 1 17 i | Fixed assets | |

FIGURE 26b

FINANCIAL STATEMENT MODULE

RELATED APPLICATIONS

This application claims the benefit of U.S. Provisional Application No. 60/172,587, filed Dec. 20, 1999.

FIELD OF THE INVENTION

The invention relates to a process, a method and an apparatus for creating financial statements using an accounting trial balance, which displays and prints the financial statements and gives details about the balances appearing in the financial statements.

BACKGROUND OF THE INVENTION

Accounting consists in measuring, taking record of and communicating the financial data concerning operations relative to the financing, the investments and the running of a business. The communication of the information is done via financial statements, which are the outcome of the accounting process. The main goal of financial statements is to provide pertinent information for the making of decisions concerning the optimal operation of a business. The presentation must be suitable, that is, enough detail so as not to introduce errors, and should include complementary notes and additional information necessary for a complete and faithful representation of the financial situation of a business at a precise date and of its productivity for a given period of time. This presentation can vary according to the needs of the reader: creditors, investors, shareholders, directors, governments, employees, general public, etc. and according to the type of business.

Accounting software systems usually output a project of a financial statement which is used only by the directors. The user must respect a rigid framework which is pre-established, fixed and limited to one type of presentation, often the statement of results or the balance sheet, without the complementary notes and the additional information. Also, the consultation of these financial statements on the screen is limited to the report itself and the user cannot go back to find the source of the information. The advantage of these financial statements is that they are integrated with the accounting system. A modification in the data of the accounting system automatically modifies the financial statement. Some report generators offer more flexibility but less integration. These generators are more and more complex as they get less rigid and more integrated because of the lack of comprehension of accounting from the computer scientists who design them or because of the lack of comprehension of the operation and possibilities of a computer from the accountants which participate in their design.

Those who produce financial statements often refer to a word processor to produce final and complete financial statements. While offering all the flexibility required, the word processor has no integration with the accounting data of the accounting system.

It would be useful and innovative if the knowledge surrounding accounting and the operation of computers would be unified to produce a tool which enables accounting systems and word processor software to create all kinds of financial statements tailored to the needs of the user, in a simple way, without respecting a rigid framework. The processing and the integration with the accounting data would permit tailored financial statements.

SUMMARY OF THE INVENTION

Accordingly, an object of the present invention is to provide a financial statement module which can create any type of financial statement for any type of business and which can be integrated with any accounting system capable of producing a trial balance, therefore answering the need of the customer for a faithful and complete presentation of the financial information.

Another object of the present invention is to provide a financial statement module which can put the balances of the trial balance in order to respect the conventional accounting principles before building the financial statement.

Yet another object of the present invention is to provide the details of any balance, to get the source of any balance and to manipulate the information contained in this detail for verification purposes: sorting of data, grouping of data, reports of inflows, reports of outflows, reconciliation.

Another object of the present invention is to be able to change the color of the displayed characters by modifying the attribute byte of each character.

Another object of the present invention is to be able to integrate the financial statement module within any word processor which would use accounting data to build financial statements.

Another object of the present invention is to create a financial statement module in which the financial or accounting information is organized and displayed as a balance sheet to put the emphasis on its financial situation, by showing the resources of the business, its obligations and its assets, and complementary notes necessary for a faithful and complete presentation.

Yet another object of the present invention is to create a financial statement module in which it is not necessary to sign the financial statements.

Another object of the present invention is to create a financial statement module which can build and display a results statement to give to the user a tool for evaluating the economical performance, for a given period of time, of the business, by putting the emphasis on the net profit, which is the surplus of the revenues over the expenses—increasing or decreasing the equity—and enables a classification according to the type of business and the nature of its revenues and expenses and the presentation of additional information.

Also, another object of the present invention is to provide a statement of the source of funds and the usage of these funds to show the movement of the funds for a given period of time, that is, the operations relative to the financing by distinguishing between the funds coming from the exploitation and the funds coming from other sources, such as loans, capital contribution and investment operations.

Another object of the present invention is to display a statement for each fund of an accounting by funds of a non-profit-making organization.

Another project of the present invention is to display the information in any other type of report in order to answer the needs of the users.

According to one aspect of the present invention, the financial statement module can be adapted to be used with any accounting system and comprises a data structure module, a report generator, a display module, a data entry selection module and a printing module, whereby financial statements of any type or format can be displayed and printed according to the needs of the user.

According to one aspect of the present invention, the data structure module comprises distinct doubly linked lists in which NEXT, PREVIOUS and structure pointers are stored, whereby the manipulation of the data is flexible.

According to one aspect of the present invention, the report generator displays the accounting data which was organized by the data structure module line by line, using parameters set by the user.

According to a second aspect of the present invention, the financial statement module comprises a detail request module which produces secondary reports containing the details of a financial statement item, the details of an account balance or the details of a document.

According to another aspect of the present invention, a method of producing financial statement reports customized to the likes of the user is provided. The method comprises the steps of: providing a set of accounting data, organizing said accounting data using doubly linked lists into a central memory of a computer and generating a financial statement.

According to another aspect of the present invention, organizing the accounting data comprises saving the accounting data in separate files on an external memory unit, wherein said accounting data can be reconstituted using said separate files.

According to still another aspect of the present invention, a method of producing financial statement reports customized to the likes of the user is provided further comprising steps of: choosing an element, such as a financial statement item, an account balance or a document, for which details are requested, providing a detail request module which fetches all information concerning the element from the accounting data and displaying said information into a secondary report.

According to another aspect of the present invention, a method for generating a financial statement is provided, comprising the steps of: selecting a type for a financial statement line, storing a data set of lines as selected in the previous step, generating a financial statement using accounting data in accordance with the line data.

According to another aspect of the present invention, a method for generating a financial statement is provided, further comprising the steps of displaying said financial statement and printing said financial statement.

According to a further aspect of the present invention, there is provided a financial statement generator comprising a line selector for selecting a type of line and editing the line, a memory unit for storing a data set of lines as selected, a report generator for generating a financial statement using said data set of lines and accounting data.

According to a further aspect of the present invention, there is provided a financial statement generator further comprising a detail selector for selecting a line for which details are requested using the accounting data and a display module for displaying the detail information.

According to a further aspect of the present invention, there is provided a financial statement generator further comprising a display module for displaying said financial statement and a printing module for printing said financial statement.

According to a further aspect of the present invention, there is provided a tool for modifying the color of displayed characters by modifying the byte attribute of each character.

According to still a further aspect of the present invention, there is provided a stand-alone financial statement module to be used with a word processor.

Using the word processor, the user fills in the appropriate information with a data entry window and the auxiliary screens of the financial statement editor.

BRIEF DESCRIPTION OF THE DRAWINGS

These and other features, aspects and advantages of the present invention will become better understood with regard to the following description and accompanying drawings wherein:

FIG. 1 is a partial example of a trial balance and a partial example of a balance sheet;

FIG. 5 illustrates the organization of the data in the central memory of the computer;

FIG. 6 is a screen display showing what the financial statement editor looks like;

FIG. 10 illustrates an example of the contents of the data structures in the central memory of the computer;

FIG. 11 is an example of the contents of the file MASTR.DAT;

FIG. 12 is an example of the contents of the file CHART.DAT;

FIG. 13 is an example of the contents of a financial statement file;

FIG. 18 is an example of a financial statement;

FIG. 19 is an example of the detail option at the financial statement item level;

FIG. 20 is an example of the detail option at the balance level;

FIG. 21 is an example of the detail option at the document level;

FIG. 25 is a screen display showing the conciliation module; and

FIG. 26 is a screen display showing windows available from a word processor.

DETAILED DESCRIPTION OF PREFERRED EMBODIMENTS

Figure 2:
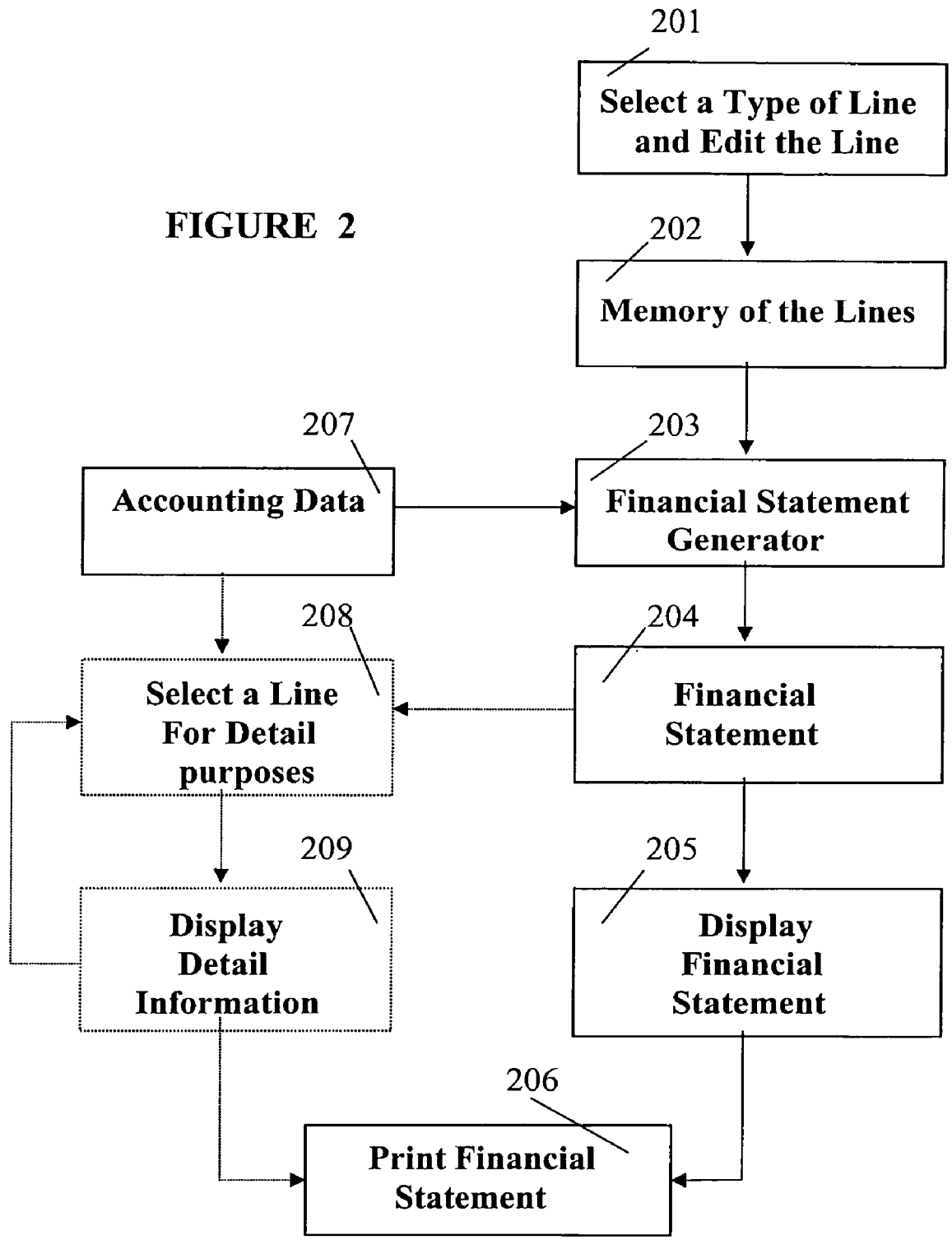
FIG. 2 is a flow chart of a preferred method according to the invention.

A method for organizing and processing accounting data and for producing financial statement reports customized to the likes of the user and for obtaining the detail of balances appearing on a financial statement for verification purposes is provided. This method builds financial statements 101 with a computer, using any accounting trial balance 100. This process, called the financial statements module, as shown in FIG. 2, creates any type of financial statement 204, customized for the user, without any framework to respect, using simple point and click on the screen and without having to sign the financial statement, using a simple distinction between different types of lines 201, the organization of data 202, the report generator 203, the display module 205 and its tool to select by pointing and the printing module 206. The financial statement module also permits to select a line 208 to obtain the details of a balance 209, details which vary according to the source of the accounting data 207.

Figure 3:
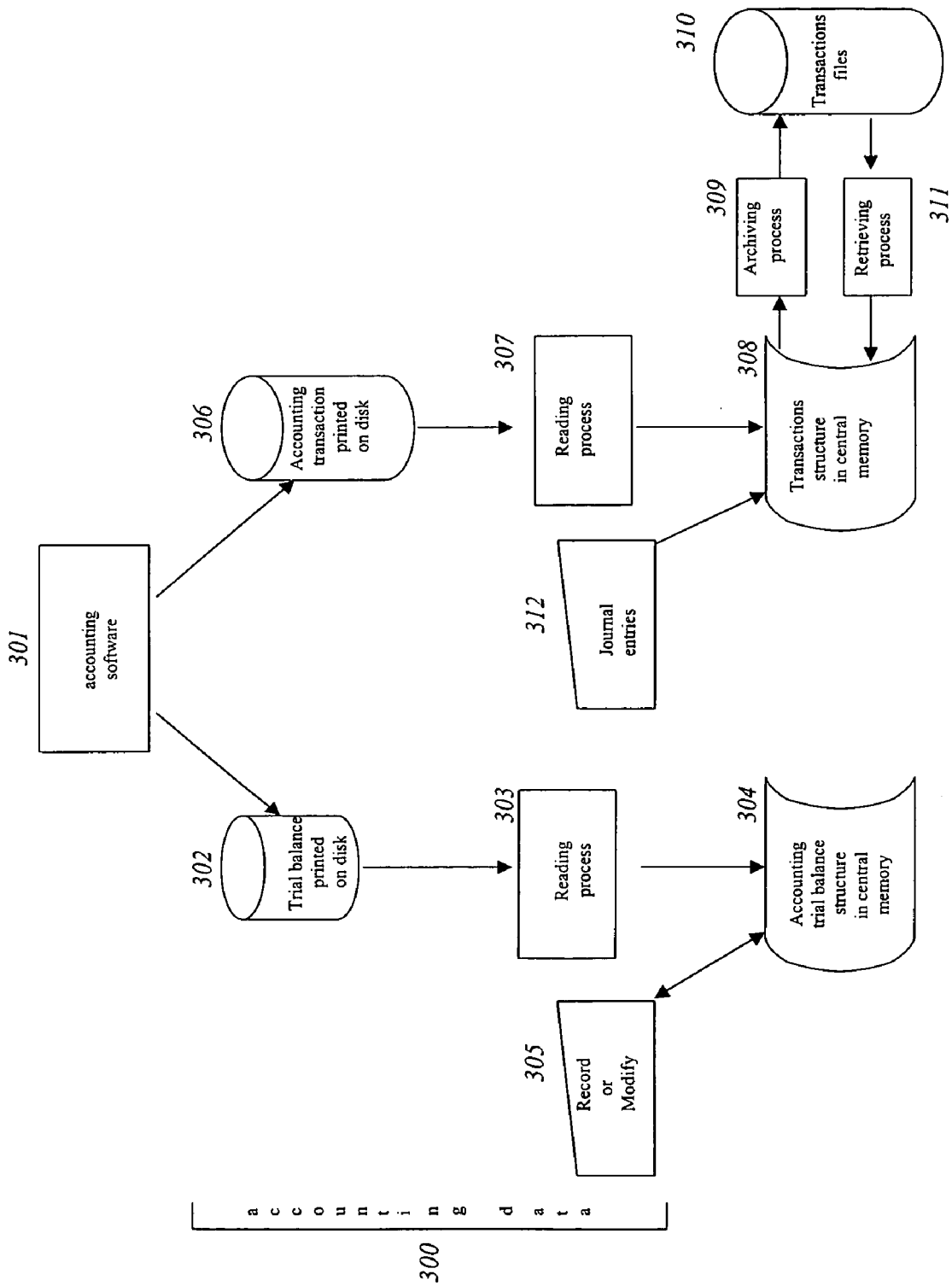
FIG. 3 is a block diagram illustrating the source of financial statement item data.

As shown in FIG. 3, the financial statement module needs accounting data 300, comprising at least a trial balance. The first step consists in loading in and organizing the accounting data in the central memory of the computer. Depending on the case, the accounting data can come from any trial balance 302, printed on disk instead of paper, by any accounting software 301 and read by the financial statement module 303 and/or using a data entry screen 305 which is used to record or modify the structure of the accounting trial balance data of FIG. 5a), contained in the central memory of the computer 304. The accounting transactions 306 listed in transactions reports printed on disk instead of paper can also be read 307, loaded in and organized in the central memory of the computer 308. As much as possible, the accounting transactions are loaded in the central memory of the computer, which avoids accessing the external memory units, for faster processes. In the case where the number of transactions is greater than the capacity of the central memory of the computer used, the user must provide a carried over date for the balance in order to separate the transactions and to save them 309 in distinct files on an external memory 310 unit which could be loaded in subsequently 311 in the central memory in order to calculate and to detail balances of the financial statements, according to date intervals selected by the user. Using a data entry screen 312, transactions, that is, journal entries for putting the balances in order and/or presentation purposes, can be added in the central memory and the external memory. The financial statement module can be used as an external tool without any accounting software or as an internal tool by integrating the algorithms described herein inside any software (accounting, word processing, etc.) running on micro-computers, mini-computers and main-frame computers, or can be used independently in order to generate financial statements. Once the financial statement is built, the financial statement editor allows to detail a balance appearing on the financial statement:
(a) details for a financial statement item,
(b) details for an account balance,
(c) details of a document.

Depending on the source of the accounting data, the financial statement module can display the detail up to the original transaction and any modifications of the transaction will be reflected on the financial statement.

The organization of the accounting trial balance data 100 in memory corresponds to a doubly linked data structure 500 which permits insertion, destruction and reordering of the accounts inside the list. As shown in FIG. 5a), a particularity of this organizational data is that the linked list 501 is distinct and contains the pointers NEXT 502 and PREVIOUS 503 and a pointer to the chart structure 504 which permits a greater flexibility for the manipulation, especially for the usage of the display module, for the maintenance of the financial statements 802 and the management of the sub-lists of the financial statement items 505.

When looking at the organization of the data of the chart of accounts, two items are particularly important: the vector LINK 506 and the field LINKTRANS 507 of the chart structure, corresponding to the sequence number of the creation of the account and which links the transactions to the accounts of the chart. It is also used to save the data of the financial statements 1201 in the files. Each time an account is created, a new element in the chart structure 508 is created. A new element in the list of pointers 509 is also created and inserted in the list. The insertion algorithm used enables the insertion in an empty list, the insertion as the first item of a list, the insertion at the end of a list, and the insertion in the list. The insertion is done before the current pointer and the algorithm uses a previous pointer (the current pointer) for its operation.

TABLE I

```
if (cour = =NULL)
            pred = last;
    else    pred = cour ->prev;
new ->prev = pred;
new ->next = cour;
f (cour = = first)
            first = new;
    else pred->next = new;
if (cour ! =NULL)
            cour->prev = new;
    else    last = new;
cour = new;
```

In order to insert at the end of the list, one needs to initialize the current pointer to nil. To modify this list with a data entry screen 305, a temporary element is added at the end of the list before its display on the screen in order to permit the insertion at the end of the list.

A new LINK vector is created with one more element than the vector it replaces. The content of the old vector is copied in the new vector and the pointer to the new element in the chart structure 510 is inserted in the new element of the LINK vector 511. The index of this element of vector 512 is inserted in the field LINKTRANS 513 of the chart structure. The memory size of the vector is attributed dynamically, as for the chart structure. The number of accounts that can be processed is only limited by the capacity of the central memory of the computer used.

When an account is deleted, the element in the list of pointers containing the pointer to the chart structure 509 is taken out of the list of pointers by modifying the pointer NEXT 502 of the preceding element and the pointer PREVIOUS 503 of the NEXT element. The destruction algorithm used to remove an element from the doubly linked list is able to process cases in which the list is empty, the element to be destroyed is the first of the list, the element to be destroyed is the last one of the list and the element is in the list.

TABLE 2

```
if (cour ! =NULL)
        {
        if cour->prev = = NULL)
                first = cour ->next;
        else    cour->prev->next = cour->next;
        if (cour->next ! = NULL)
                cour->next->prev = cour->prev;
        else    last = cour->prev;
        }
```

The memory for the element of the list 509 and that of the chart structure 508 is reallocated. The element of the LINK vector 511 is initialized to nil but is not reallocated. The number of elements of the LINK vector 514 is cumulative. Only an inactive account can be deleted. An inactive account is an account for which the balance in the trial balance is zero, is a non-grouped account in a financial statement (FLAG_F/S 515 is nil), and is an account to which no transaction is linked (516 is nil).

When an account is moved within the list, only the NEXT 502 pointer and the PREVIOUS 503 pointer of the elements concerned in the list of pointers are modified, using, in a successive fashion, the algorithm of destruction and the algorithm of insertion.

The account number has a descriptive use and can be modified at all times.

The pointers for the first element 517 and the last element 518 of the list of pointers 501 as well as the pointer to the first element 519 of the LINK vector are stored in memory throughout the operation of the financial statement module.

Figure 4:
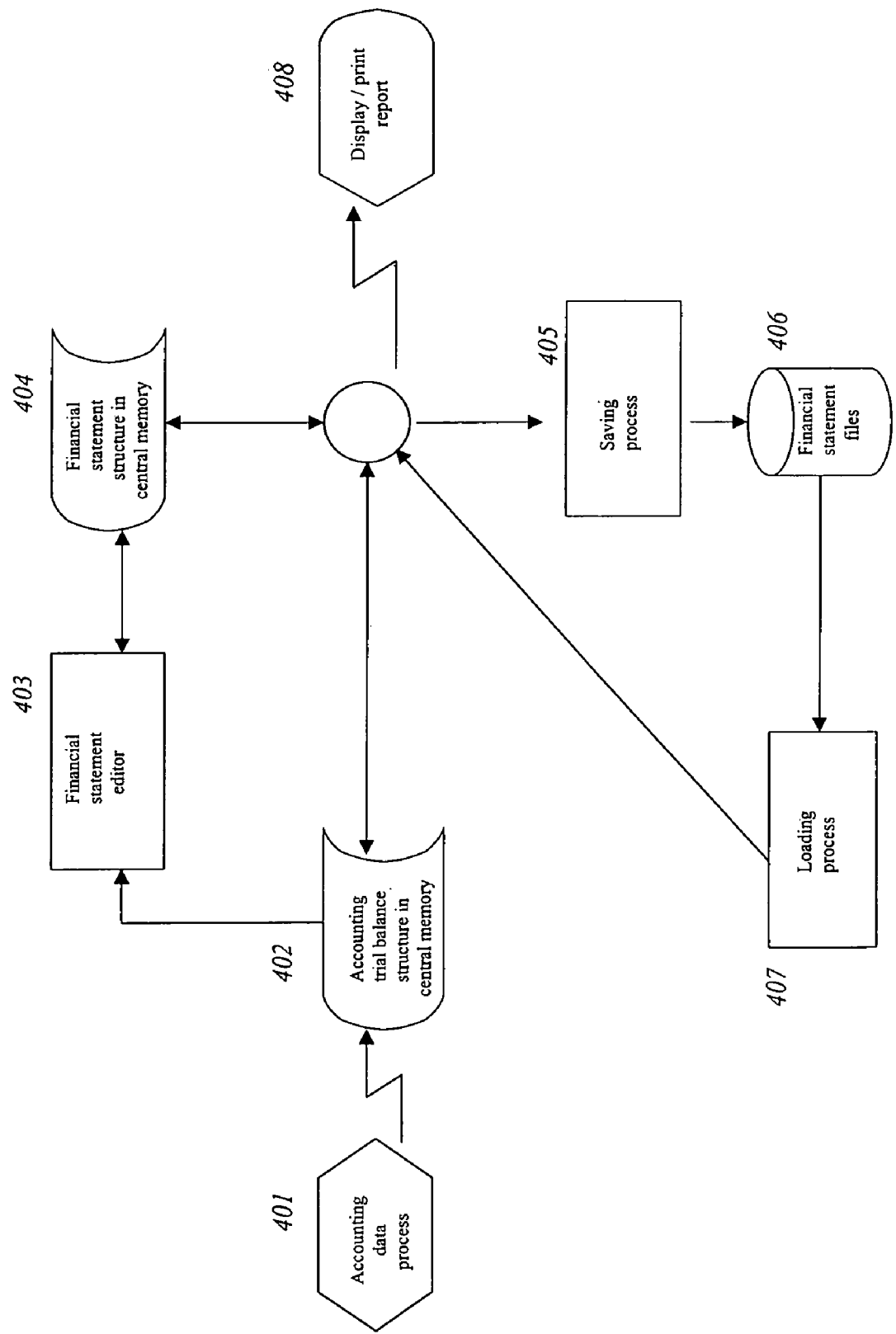
FIG. 4 is a flow chart illustrating the processing on the data for a financial statement.
Figure 6:
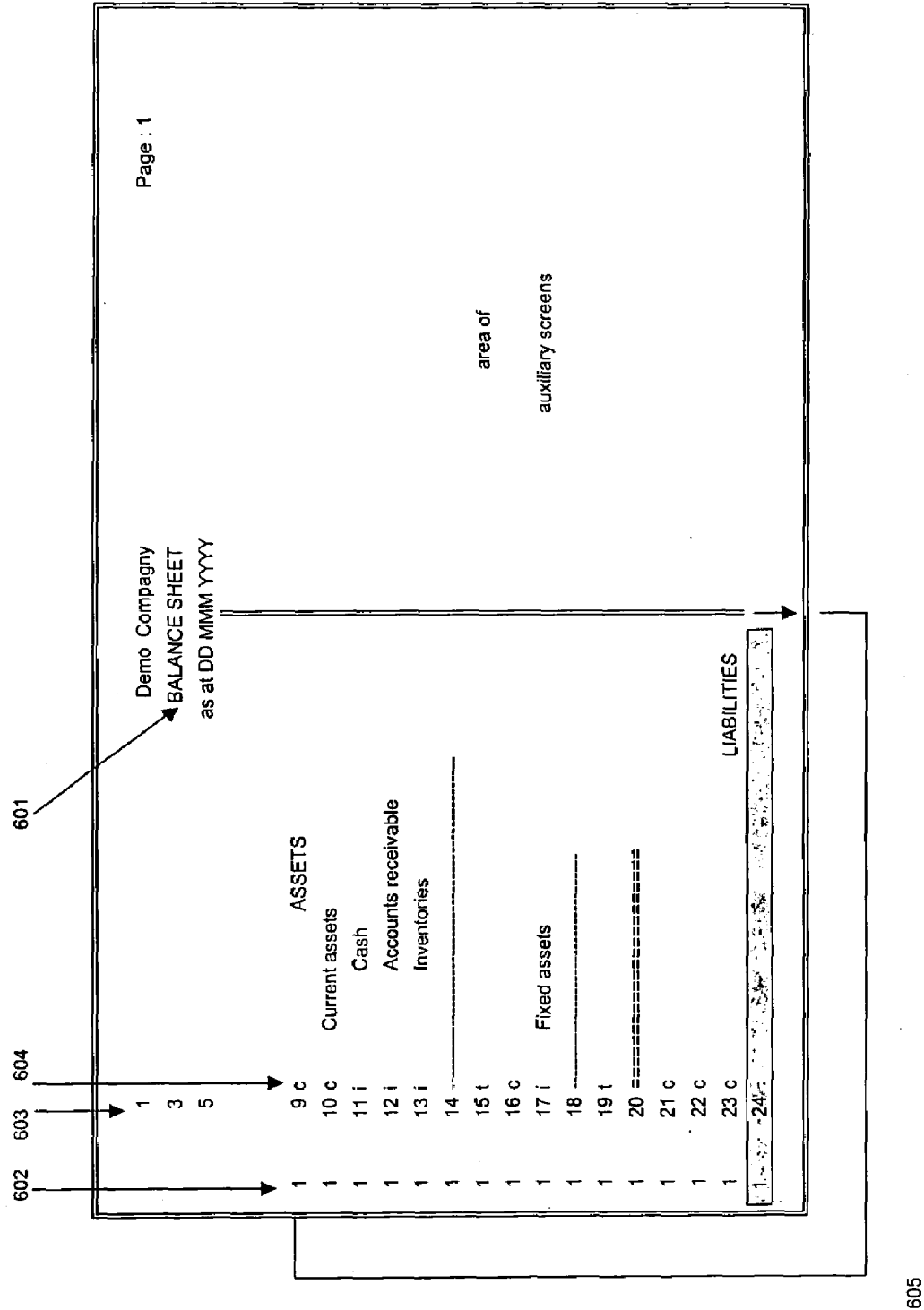
Figure 7:
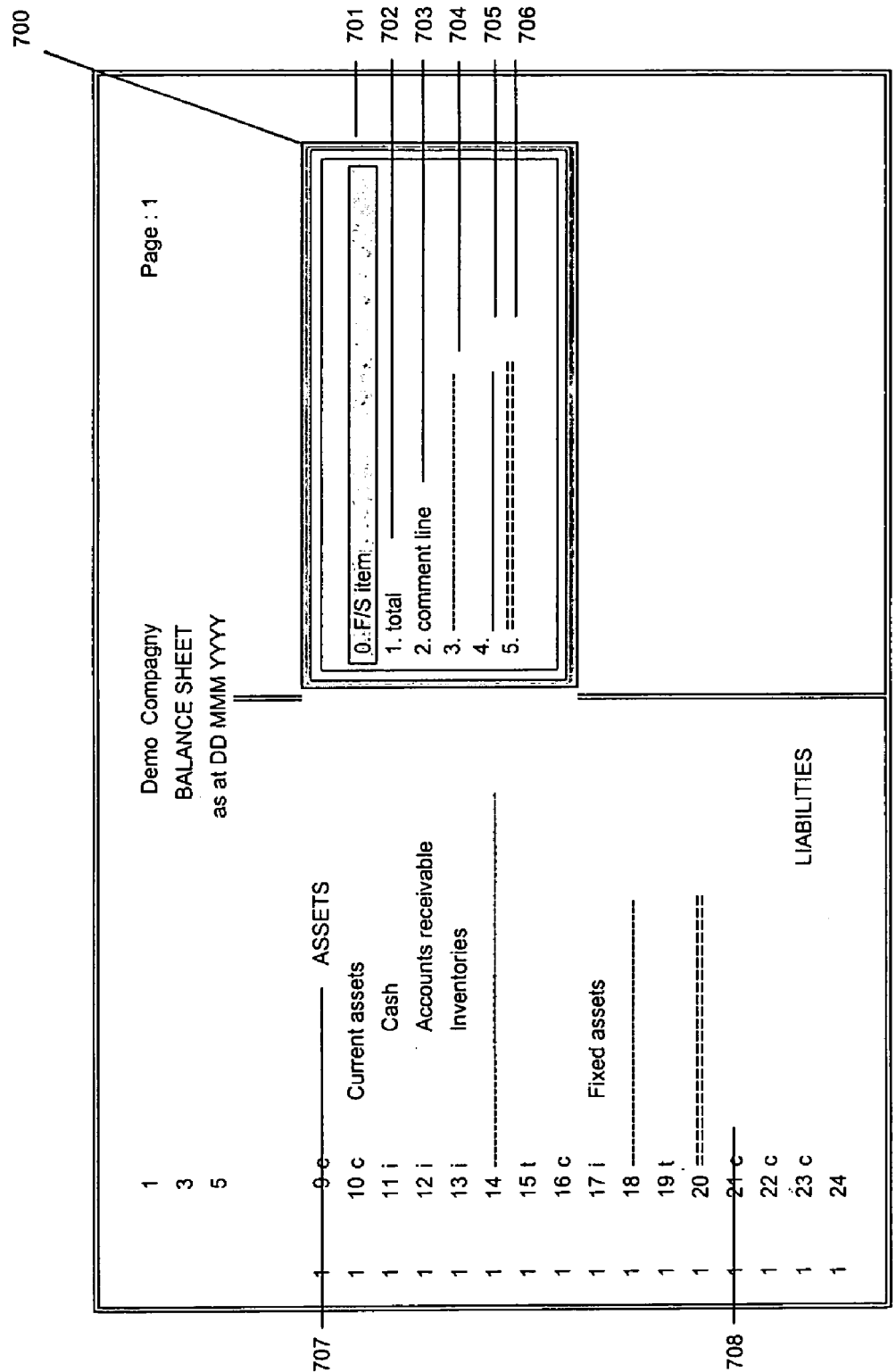
FIG. 7 is a screen display showing the different types of lines to be chosen from the attribute to a financial statement line.
Figure 8:
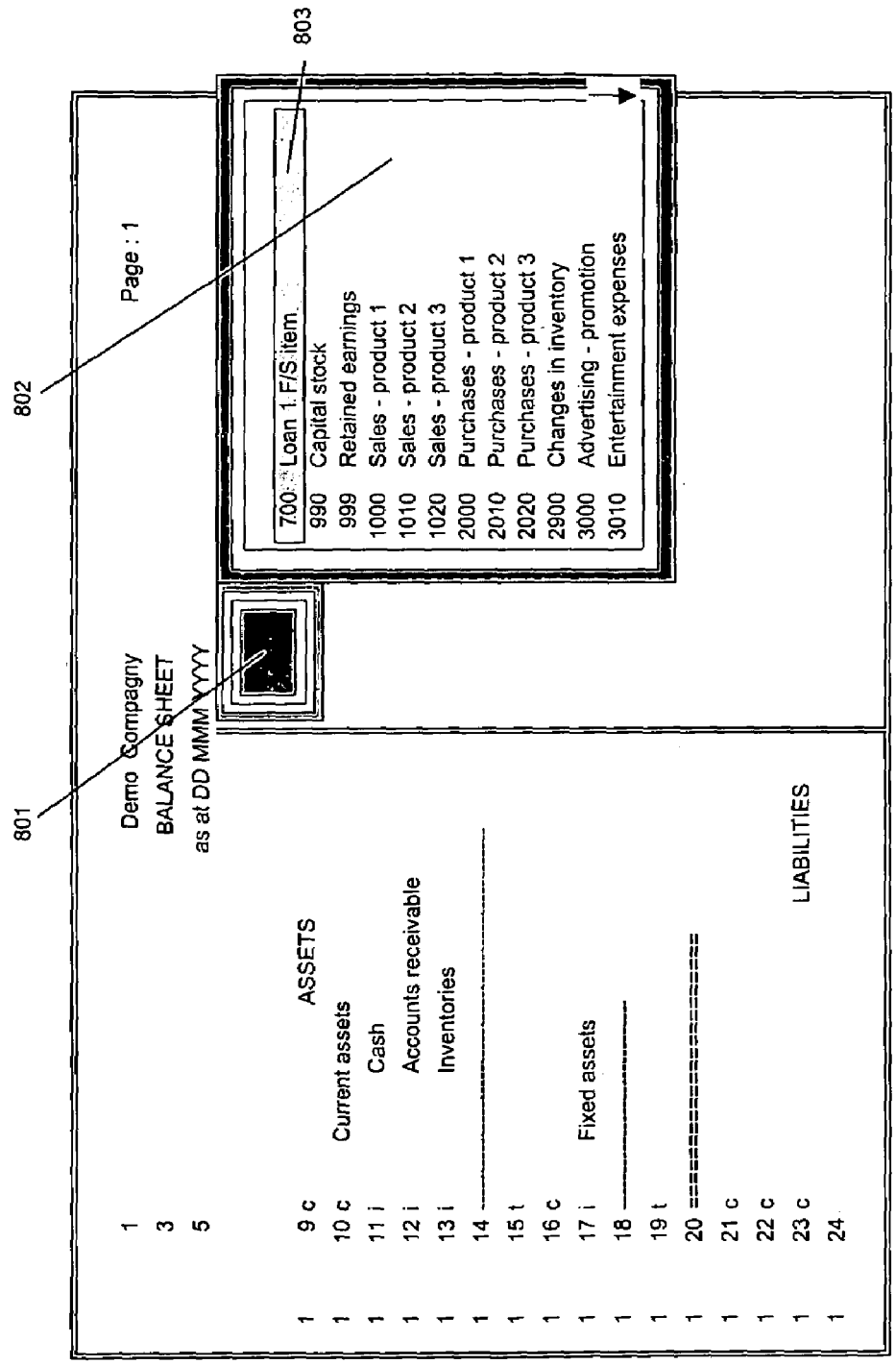
FIG. 8 is a screen display showing the auxiliary screens appearing when selecting the accounts to group to a line of the type financial statement item, that is, the list of accounts already grouped and the list of accounts which can be selected.
Figure 9:
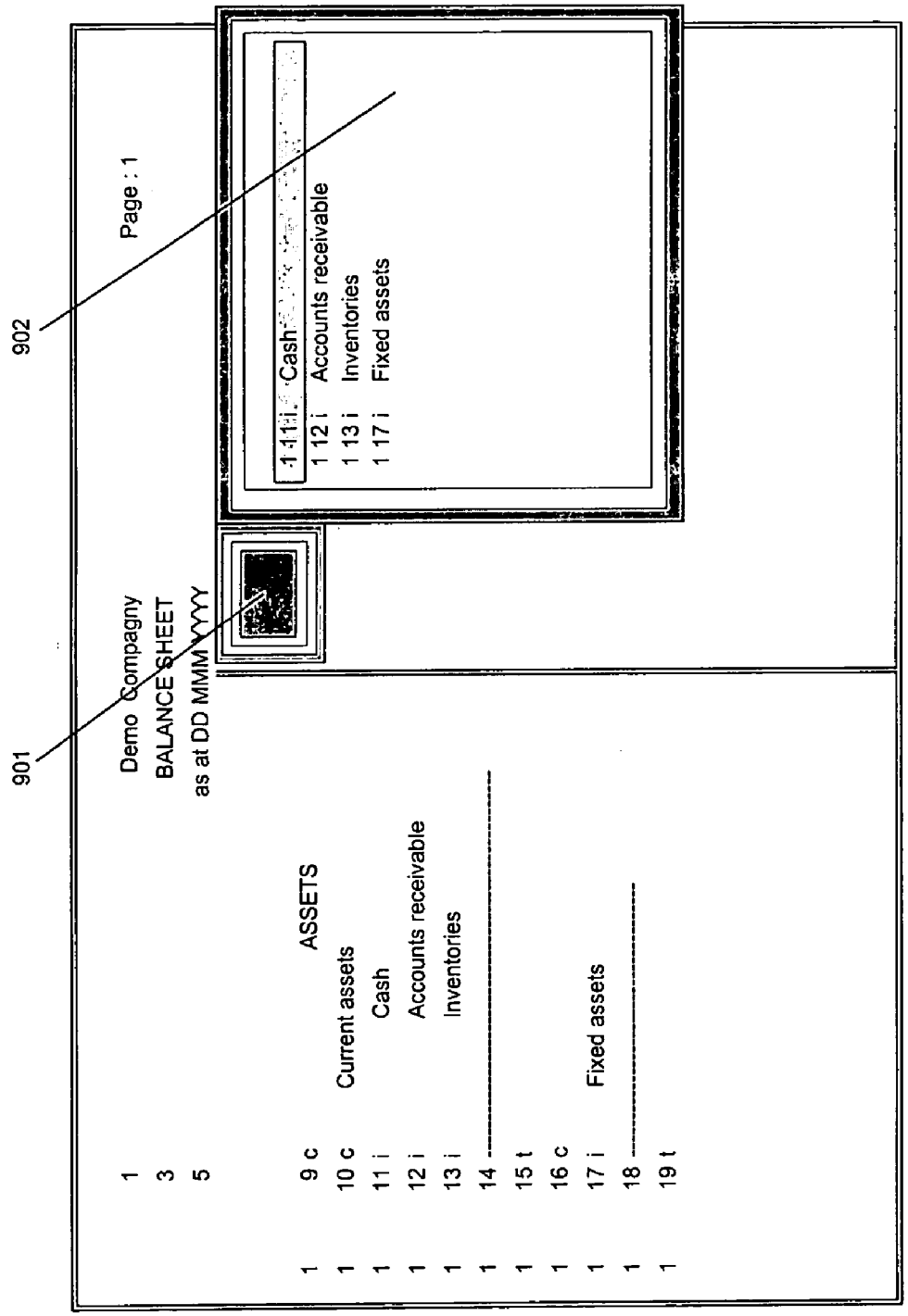
FIG. 9 is a screen display showing the auxiliary screens appearing for the selection of financial statement items to group to a total line, that is, the list of financial statement items already grouped and the list of financial statement items that can be selected.
Figure 14:
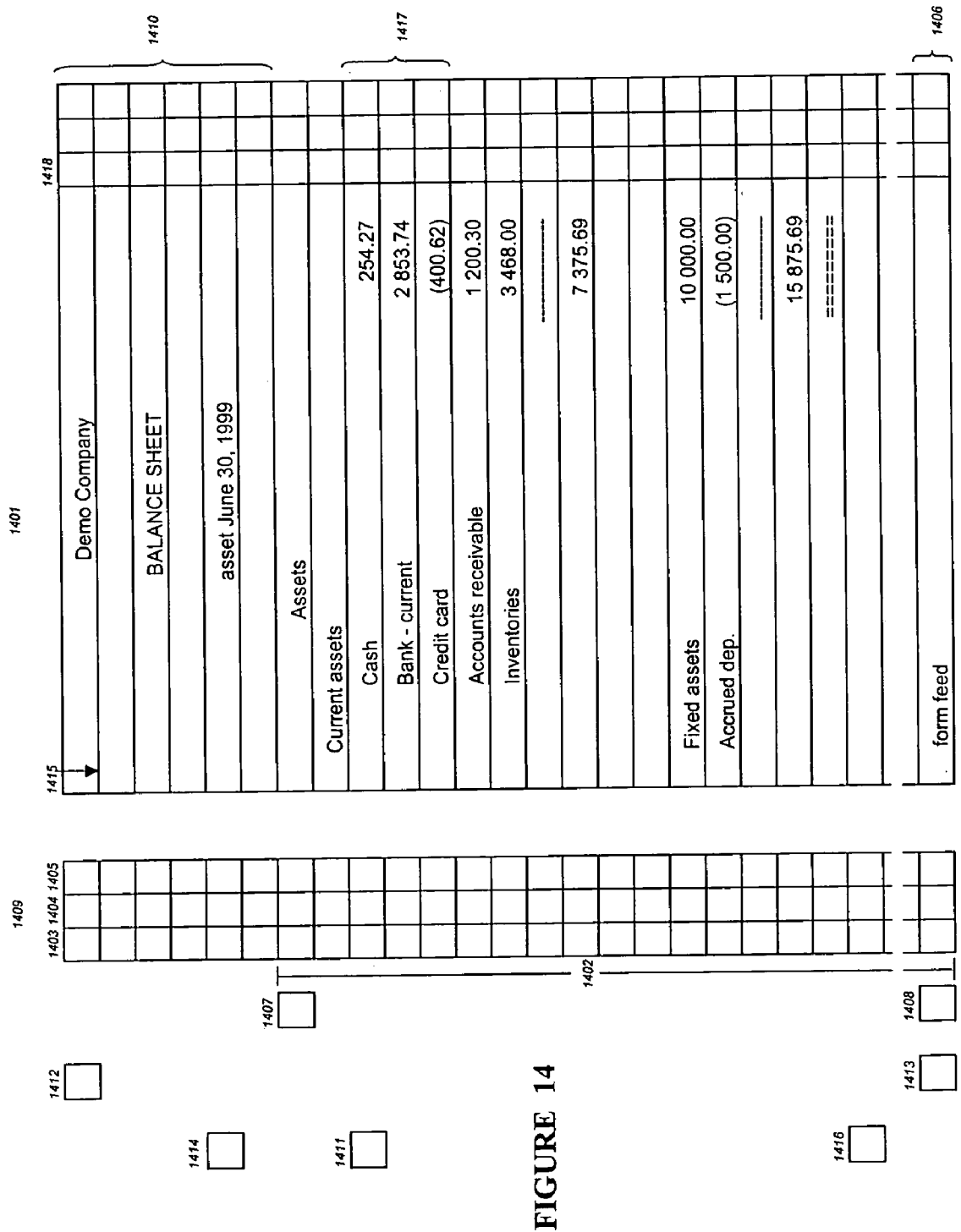
FIG. 14 illustrates an example of the contents of the display structure.

FIG. 4 shows the processing done on the data organization in memory for the financial statements which, after the processing of the accounting data 401 has placed the data of the trial balance in the central memory 402, which permits the financial statement module to create the financial statement 403 with the financial statement editor of FIG. 6 and to organize these data in central memory 404.

This organization corresponds to a doubly linked data structure 520 permitting insertion, destruction of lines of the financial statement inside of the list. As sown in FIG. 5b, a particularity of this organization is that the linked list is distinct 521 and contains the pointers NEXT 522 and PREVIOUS 523 and a pointer to the financial statement structure 524, which makes the manipulation flexible, especially for the usage of the display module and the management of the sub-lists total 525.

An important field in the structure of the financial statement is the line type number 526.

The financial statement editor of FIG. 6 indicates the name of the financial statement 601 and, for each line of the financial statement, the number of the page 602, the number of the line 603, and the type of line 604.

Each time a line is created, a new element in the financial statement structure 527 is created. A new element in the list of pointers 528 is also created and inserted in the list, using the insertion algorithm.

When a line is destroyed, the element of the list of pointers containing the pointer to the financial statement structure 528 is taken out of the list of pointers with the destruction algorithm.

The memory allowed for the element of the list 528 and that of the financial statement structure 527 are reallocated.

When the line destroyed is a line of the financial statement item type, the FLAG_F/S 515 of the chart structure of accounts for which pointer 504 is in the sub-list financial statement item 505 must be reinitialized and the elements of sub-lists total 525 of financial statement lines of type total for which the contained pointer 529 corresponds to the financial statement item pointer 524 deleted is removed with the destruction algorithm.

The pointers of the first element 530 and of the last element 531 of the list of pointers 521 are stored in memory throughout the operation of the financial statement module.

The user must determine the type of each of the lines of the financial statement. When the user decides to insert a new line in the financial statement, an auxiliary screen 700 appears to help the user select the type of this line: 3.704, 4.705 and 5.706 are the three types of underlined symbols (dashed, continuous, double-dashed) of balances appearing in the financial statement. These underlined symbols are automatically aligned underneath the balances by the financial statement generator. The type 2.703 is used to insert headers 707, blank lines 708, etc. The types 0.701 and 1.702 represent lines in the financial statement comprising balances. This important distinction between these two types of balances appearing on a financial statement 102 and 106, and the way they are processed, constitute the cornerstone of the invention.

An item in the financial statement 102 is a group of accounts 103, 104 and 105. The financial statement editor enables the user, using the data structures of the chart of accounts and the display module, to make these groups in a simple and rapid way by pointing. After the user has selected the type 0.701, the financial statement editor displays the accounts that are already grouped to this item 801 and displays the accounts that are not yet grouped to an item of the financial statement 802, since an account cannot be grouped twice in the same financial statement.

The list of grouped accounts 801 displayed corresponds to a partial description as enabled by the display module, of the accounts of the chart structure 532 to which the pointer is in the sub-list item 505 of the current line of the financial statement, to which sub-list a temporary element is added to the end before its display to permit the insertion at the end of the list as described earlier for the modification of the list with the data entry screen.

The list of non-grouped accounts 802 is built by reproducing the list of pointers of the chart structure 501 in another list (CNG list) and by sweeping the sub-list of each of the financial statement items of the financial statement 505 to remove from the CNG list, the accounts already grouped to an item, since an account cannot be grouped twice for the same financial statement.

The user can insert a new account to the list of grouped accounts at the item 801 or can remove one.

For inserting an account, the user selects, using the display module, an account from the list of non-grouped account 802. The latter one is removed from this CNG list, with the destruction algorithm, and is added to the list of grouped accounts at item 801, that is, inserted, with the insertion algorithm, to the sub-list item 505 which is a distinct doubly linked list containing the pointers NEXT 533 and PREVIOUS 534 and a pointer to the chart structure of accounts 535. In the financial statement structure 520, the line type number 526 of the financial statement structure is initialized to zero.

To remove an account from the list of grouped accounts, the account is deleted from the sub-list item 505 with the destruction algorithm and is inserted in the CNG list.

The address of the first and the last element of the sub-list is stored in the financial statement structure in the fields FIRST account 536 and LAST account 537.

When a line of financial statement item type is inserted, at least one account must be grouped to it.

A total on the financial statement 106 is a total of balances of items. The financial statement editor enables a user, using the data structures of the financial statement and the display module, to do groups of financial statement items in a simple and rapid way by pointing financial statement items. After the user has selected the type 1.702, the financial statement editor displays the lines of financial statement items which are already grouped to this total 901 and displays the items which are not yet grouped 902 to this total. An item can be grouped to more than one line of type total.

The list of grouped items 901 displayed corresponds to a partial description of the items of the financial statement structure 520 to which the pointer 529 is in the sub-list total 525 of the current financial statement line, before its display, a temporary element is added at the end of the sub-list to permit the insertion at the end of the list, as described earlier for the modification of the list with the data entry screen.

The list of non-grouped items (PNG list) 902 is built by creating a list of financial statement structure pointers 521 inserting the lines of type item which precede the line of type total, and by removing from this list the items already selected and included in the sub-list total 525 of the current line of type total, since the balance of an item cannot appear twice for a same total.

The user can insert a new item to the list of grouped items to the total 901 or can remove one.

To insert a new item, the user selects, through the display module, an item from the list of items to group 902. The latter one is removed from this PNG list, with the destruction algorithm, and is added to the list of grouped items to the total 901, that is, inserted using the insertion algorithm to the sub-list total 525 which is a doubly linked distinct list containing the pointers NEXT 538 and PREVIOUS 539 and the pointer to the financial statement structure 529 of the line of type item. In the financial statement structure 520, the line type number 526 of the financial statement structure is initialized to one.

To remove an item from the list of grouped items, the item is removed from the sub-list total 525 using the destruction algorithm and is inserted in the PNG list.

The address of the first and the last element of the sub-list total is stored in the financial statement structure in the FIRST item 540 and the LAST item 541 fields.

The conventional classification of a trial balance comprises the financial statement item's assets, liabilities, profits, revenues and expenses. This classification facilitates the building of the groups in the conventional financial statements. With the financial statement editor, this classification is not important since the groups of accounts under the items of the financial statements are done account by account.

Figures 10, 10A, 10B:
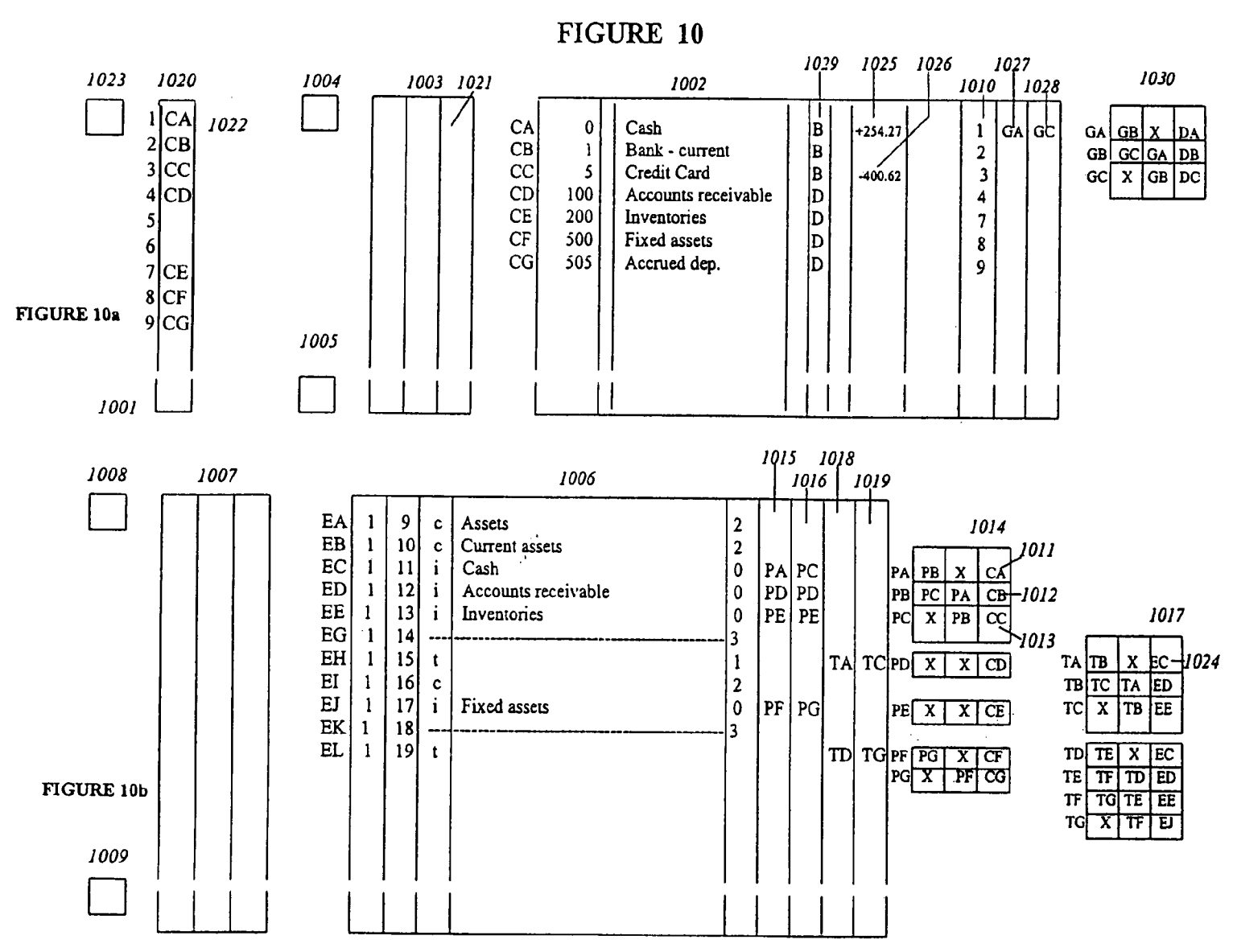

FIG. 10 shows an example of the contents of the central memory. The next step 405 consists in saving these data in an external memory unit 406 in order for the data structures of FIG. 10, created with the financial statement module, to be reconstituted and their contents to be reloaded in memory. The number of elements of vector LINK 1001 is saved 1101 in file MASTR.DAT of FIG. 11. The contents of the chart structure 1002 is saved in a sequential fashion by sweeping the list of pointers of chart structure 1003 from the first element 1004 to the last element 1005 as shown in FIG. 12. The contents of the financial statement structure 1006 is saved in a sequential fashion by sweeping the list of pointers of the financial statement structure 1007 from the first element 1008 to the last element 1009 as shown in FIG. 13. For the sub-lists items and the sub-lists totals, the LINKTRANS 1010 of the accounts are saved.

For a line of type item on the financial statement, the LINKTRANS 1010 of each account grouped at item 1301, 1302 and 1303 is saved, that is, the LINKTRANS corresponding to the pointers of the chart structure 1011, 1012 and 1013 of the sub-list item of which the pointer to the first element is in the financial statement structure 1015, as for the pointer to the last element 1016. The LINKTRANS of the last element being saved, the maximum value of the round number is saved 1304.

For a line of type total on a financial statement, the LINKTRANS of the first account of each item grouped at total 1305, 1306 and 1307 is saved. This LINKTRANS corresponds to the pointers of the chart structure (for example 1011) of the sub-lists items 1014 for which the pointer of the first element of the sub-list is in the financial statement structure 1015 and for which the pointer to the financial statement structure 1024 is contained in an element of the sub-list total 1017 for which the pointer of the first element is in the structure financial statement 1018, as for the pointer of the last element 1019. The LINKTRANS of the first account of the last element being saved, the maximum value of a round number is saved 1308.

The next step 407 consists in reading the data of the financial statement module saved 406 by the preceding step 405 and to initialize the data structures of FIG. 5 in the central memory 402, 404.

The chart structure 1002 and the doubly linked list of pointers to the chart structure 1003 are built sequentially after reading the file CHART.DAT of FIG. 12. Each element of the list of pointers is added at the end of the list with the insertion algorithm. The pointers of the first element 1004 and the last element 1005 of the list of pointers 1003 are saved in memory throughout the operation of the financial statement module.

The vector LINK 1020 is created. The number of elements of the vector LINK is the number saved 1101 in MASTR.DAT. The elements of the vector are initialized by sweeping the chart structure 1002 in a sequential fashion with the list of pointers 1003 and by attributing, for each account in the list, the pointer to the chart structure 1021 to the element of the vector 1022 corresponding to the index LINKTRANS 1010 of the account. The pointer of the first element 1023 of the LINK vector is saved in memory throughout the operation of the financial statement module.

The financial statement structure 1006 and the doubly linked list of pointers of the financial statement structure 1007 are built sequentially to the reading of the financial statement file of FIG. 13. Each element of the list of pointers is added a the end of the list with the insertion algorithm. The pointers of the first element 1008 and of the last element 1009 of the list of pointers 1007 are saved in memory throughout the operation of the financial statement module.

For the creation of sub-lists of item 1014, comprising an element for each account of the item, an element is added at the end of the list, with the insertion algorithm, for each LINKTRANS 1301, 1302, 1303 read in the financial statement file until the maximum LINKTRANS 1304. The contents of this element 1011 is initialized to the value of the content of the element at the index LINKTRANS in the vector LINK 1022, which contains the pointers to the chart structure.

For the creation of sub-lists total 1017, comprising an element for each item of the total, an element is added at the end of the list of this list of pointers, with the insertion algorithm, for each LINKTRANS 1305, 1306, 1307 read in the financial statement file until the maximum LINKTRANS 1308. The contents of this element 1024 is initialized to the value of the pointer of the financial statement structure 1006 for which the LINKTRANS 1010 of the first account 1015 of the sub-list item 1014 corresponds to the LINKTRANS read (for example, 1305). To find the pointer to the financial statement structure, the module sweeps the list of pointers 1007 from the first element 1008 until the current element.

The important elements of the financial statement module are the LINK vector, the LINKTRANS field of the chart of accounts and the line type number field of the financial statement.

The next step consists of generating the financial statement report. The financial statement generator 203 initializes, for each element of the financial statement structure 1006, an element of the display structure 1401 for which the pointer 1405 is contained in an element of a distinct doubly linked list 1402 with the pointers NEXT 1403 and PREVIOUS 1404.

The contents of the lines of the display structure come from the combination of the data from the chart structure 1002 (for the balances) and from the financial statement structure 1006.

In mathematics, we obtain totals, positive or negative, by adding or subtracting numbers. To increase a total, we add, to decrease it, we subtract.

In accounting, the notions of addition and subtraction and of positive or negative totals are slightly changed. In accounting, there are debit balances and credit balances which are increased or decreased by debiting or crediting amounts. Therefore, a debiting balance is increased by debiting an amount and is decreased by crediting an amount. A credit balance is increased by crediting an amount and decreased by debiting an amount. The double entry accounting principle implies that, for each accounting transaction, a balance is debited of the amount of the transaction and another balance is credited of the same amount. Therefore, the compilation of a trial balance 100, which lists all the accounts of the accounting system with their respective balance, at a given date, allows for the verification that the total of the debit balances equals the total of the credit balances and indicates if the accounting process for each transaction filed in the double entry accounting principle has been respected.

Figure 15:
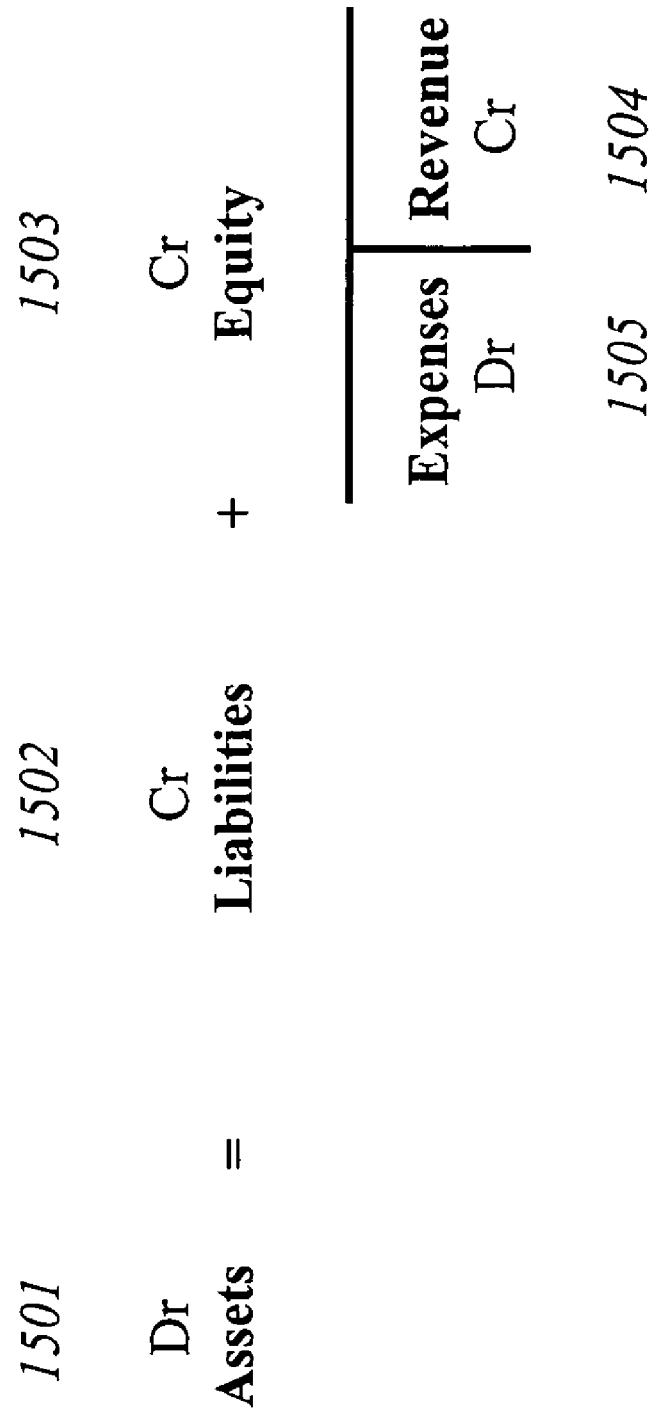
FIG. 15 illustrates the accounting equation.

The accounting equation of FIG. 15 is another illustration that the total amount of debits must equal the total amount of credits. The left portion of this equation has a debit direction and the right portion of the equation has a credit direction. That is, to increase the left side of the equation, therefore to increase the assets 1501, we have to debit an amount. To increase the right side of the equation, therefore to increase the liabilities 1502 or the equity 1503, we have to credit an amount. The profit or the losses of a business result form the difference between the revenues and expenses and increases or decreases the equity. Therefore, the revenues credit the equity 1504 and the expenses debit the equity 1505. To debit and credit these balances with mathematical functions in a computer which add and subtract numbers, the financial statement module treats the information in the following way. Using the balances of the trial balance 100, the module stores in memory a positive number for a debit balance of an account 1025 and a negative number for a credit balance 1026. These positive and negative numbers are accumulated, that is, added, never subtracted, in order to obtain the balances of the items and the totals for the financial statement. If the total of the amounts is positive, the balance is a debit balance. If the total of the amounts is negative, the balance is a credit balance.

When a financial statement is built, positive numbers and negative numbers are not shown. What is shown is balances. According to the accounting equation, the balances on the left of the equation are debit balances and the balances on the right of the equation are credit balances. For each account, a direction is attributed 1029. The tag D is for debit and the tag C is for credit. For each item, the module uses the direction of the first account of the item to determine the direction of the item. Each total resulting of the addition of the balances of each of the accounts pointed to in the sub-list of the item 1014, is multiplied by 1 or by −1 according to the direction (D or C) of the first account of the item. A negative result for this multiplication is shown in parentheses for display purposes of the balance on the financial statement.

A balance is shown in parentheses only if it is of opposite direction to the direction of the item and not if it is a credit balance or not if it is of opposite direction to the direction of a section of the financial statement or of the whole financial statement in which it is shown. Therefore, a debit balance is shown in parentheses if the direction of the item is a credit, and a credit balance is only shown in parentheses when the direction of its item is a debit.

The same principle applies for the presentation of the balances of the totals. The module uses the direction of the first account of the first item of the total to determine the direction of the total. The total of a balance for a line of type total comes from the addition of the balances of each of the accounts pointed to by the sub-list item of each of the items pointed to by the sub-list total of the total. Each total is multiplied by 1 or by −1 according to the direction (D or C) of the first account of the first item. A negative result for this multiplication is shown in parentheses for display purposes. Once the information is transferred into the display structure 1401, a last line comprising a page jump 1406 is added to the list. The module stores the pointer to the first element 1407 and the pointer to the last element 1408 in this list 1402.

Figure 16:
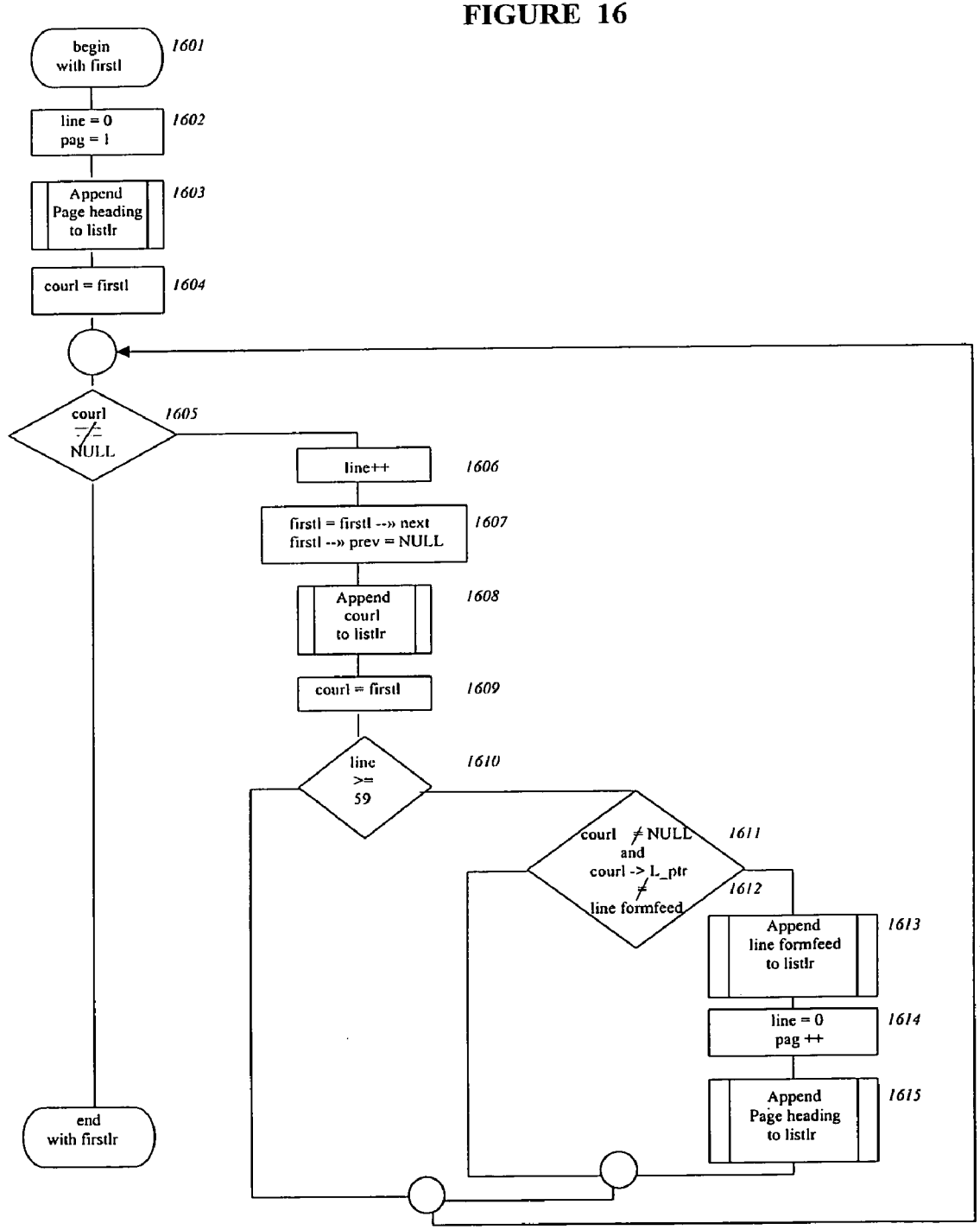
FIG. 16 is a flow chart of the skeleton of the report generator.
Figure 17:
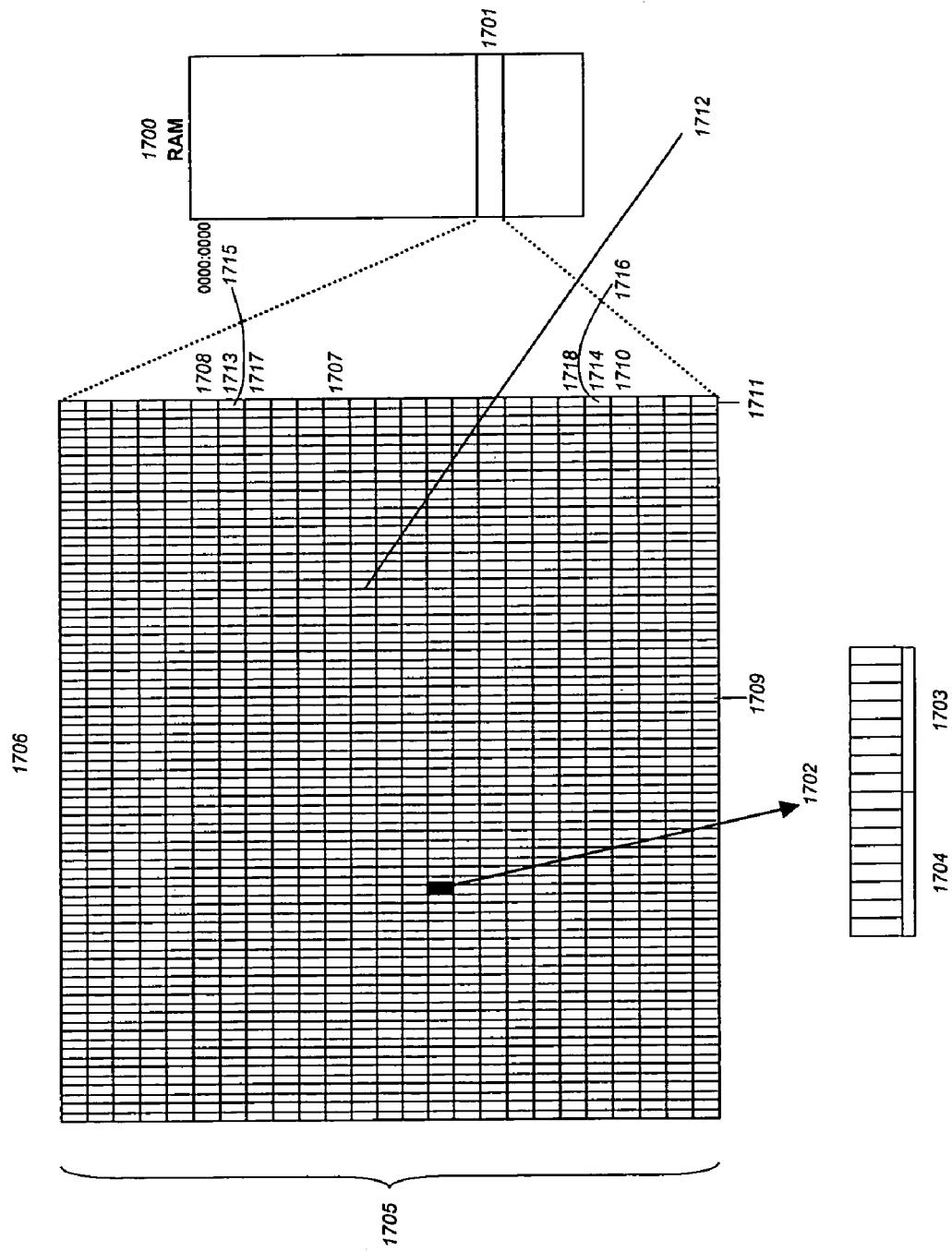
FIG. 17 is the standard structure of the video RAM in text mode.
Figure 22:
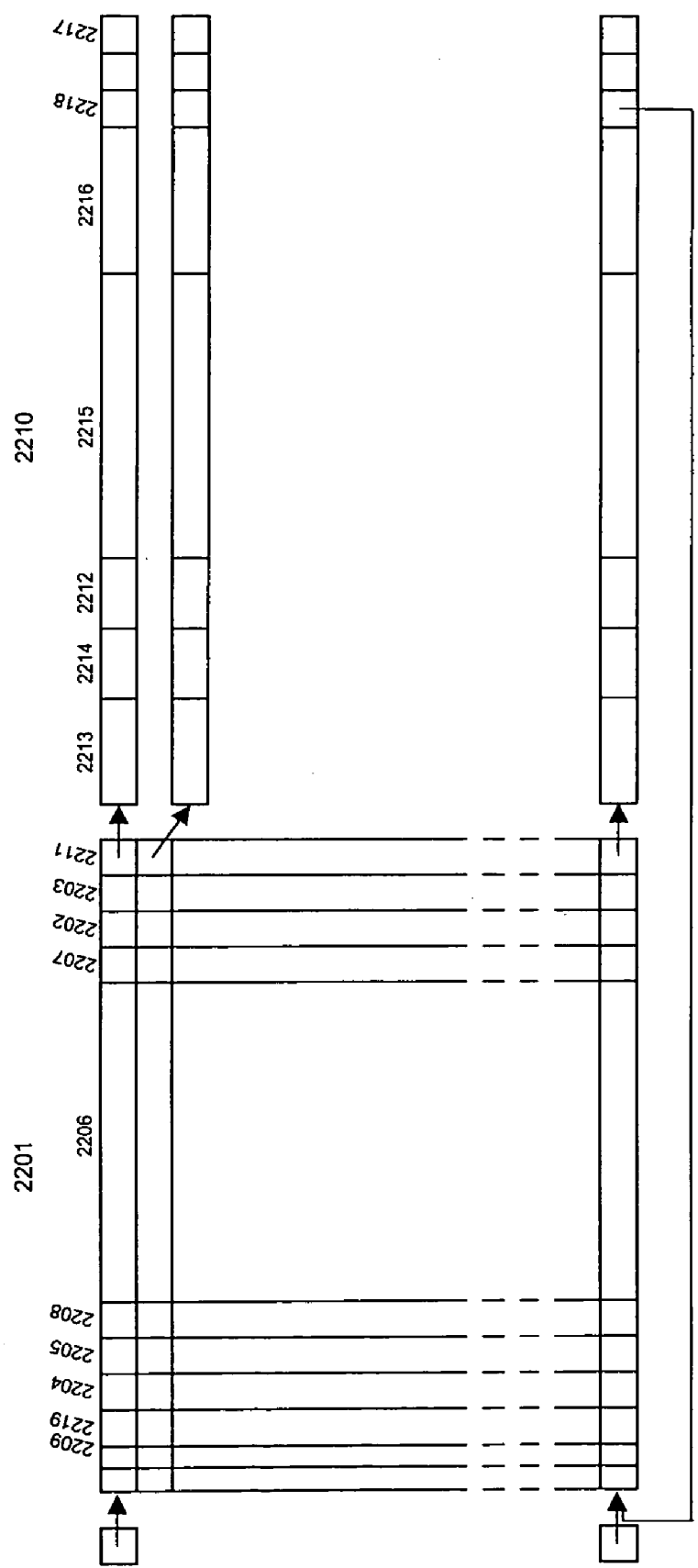
FIG. 22 illustrates the organization of the transactions in the memory of the computer.

The list then goes through the skeleton of the report to build the report to display or print 408. FIG. 16 illustrates the algorithm which does the steps of adding the headers for the pages and the page jumps inside of the display structure list. In order to do so, the module creates another list of pointers 1409. At step 1601, the module receives the pointer of the first element 1407 from the list 1402 of the display structure 1401. It initializes a line counter to zero and a page counter to one at step 1602. It begins the list of pointers 1409 by adding, with the insertion algorithm, the header lines 1410 at step 1603. Then, it sweeps the list 1402 from the first element 1407 until the last element 1408 at steps 1604 and 1605. For each element, the line counter is incremented by one at step 1606. The element is removed from the list 1402 at step 1607 by initializing the pointer to the FIRST element 1407 of the list 1402 to the NEXT element and by setting to nil the pointer to the new first element pointing to the preceding element. The element is added to the list 1409 at step 1608. The pointer to the current element 1411 of the list 1402 is then incremented to the NEXT element at step 1609 before beginning the following test:

If the line counter is greater than or equal to 59, at step 1610, then if the pointer to the current element is not nil 1611 and if the current display line is not a page jump 1612 then the processing of a new page is begun.

The processing of a new page adds a page jump line 1613 to the list 1409, reinitializes the counter of lines to zero 1614, increments the page counter by one 1614, adds the header lines for the page 1615 to the list 1401. It is important that the last element of the list 1402 be a page jump line 1406 before going through the skeleton of the report, because if it is not, the list 1409 will not have a page jump on the last page of the report. The test 1611 ensures that the processing of a new page is not done after the end of the report. The test 1612 ensures that the processing of a new page is not done at the end of the report. The report, of which an example is shown in FIG. 18, is then ready to be displayed and printed.

The display 205 of an example of this report is shown in FIG. 18. The display of all the auxiliary screens 605, 700, 801, 802, 901, 902 and the manipulation done on this display, including the selection of lines for the auxiliary screens for example, is done by the display module. This module can display any data structure which is doubly linked in a distinct list containing the pointers NEXT and PREVIOUS and a pointer for the structure, for example, the display structure 1401, the chart structure 1002 and the financial statement structure 1006.

The module can do partial display of a line of the structure, that is, the number of characters to be displayed can vary and, the first character displayed can be different from the first character of the line of the structure. Therefore, the module can directly get its input form the chart structure 1002 to display the auxiliary screens 801 and 802 and directly take from the financial statement structure 1006 to display the auxiliary screens 901 and 902.

To display the information, the module directly transfers the characters, one by one, in the video RAM in text mode 1701. The video RAM contains 4000 bytes. Since each character displayed on the screen necessitates 2 bytes 1702, that is 1 byte for the ASCII code of the character 1703 and 1 byte for the character attribute 1704, the video memory can contain 2000 characters. These 2000 characters are represented on 25 lines 1705 and 80 columns 1706 as for any screen of a computer. Using the segment address of the video RAM, the display module modifies the content of the 4000 bytes of the video RAM to execute its process of display and manipulation of display.

The module receives, as parameters, the pointer to the first element 1412 and the pointer to the last element of the list of pointers 1413 of the structure to display, the pointer to the first element displayed 1414 from the list, the pointer to the current element 1411 which, in selection mode, contains the line pointer of the selected display structure and for which the byte attribute of each of the characters for the corresponding line in the video memory is in inverse video mode 803, the current line number 1707 which corresponds to the line number of the video memory, of the screen, where is displayed the line of the structure pointed by the current element pointer 1411, the number of the line of the frame top of the display window 1708, the number of the far left column of the frame of the display window 1709, the number of the line of the frame bottom of the display window 1710, the number of characters of the line to transfer to the display window, the number of the first character 1415 from which each line of the structure will be copied in each line of the display window. The module calculates the number of the far right column of the frame of the display window 1711 by adding the number of characters of a line to transfer in the display window to the number of the far left column of the frame of the display window 1709 plus 1.

The display space 1712 used by the display module is inside this frame, that is, one line below the upper line of the frame of the display window 1708, one column to the right of the far left column of the frame of the display window 1709, one line above the bottom line of the frame of the display window 1710 and one column to the left of the far right column of the frame of the display window 1711. The module initializes the first line number of the display space 1713 by adding 1 to the number of the upper line of the frame of the display window 1708. To initialize the last line number of the display space 1714 the module calculates the number of lines of the display structure 1401, then compares it to the number of lines of the display space and adds the smaller number to the number of the first line of the display space 1713. Simultaneously, a pointer to the first element displayed when the last element of the list is displayed 1416 is initialized by climbing up the display structure list of the number of lines of the display space without going further than the number of lines of the display structure 1401.

The module then fills in the display space of the video memory 1712, character by character, by copying the contents of the display structure 1401 from the number of the first character 1415 of the line of the structure pointed by the pointer to the first element displayed from the list 1414. In the rare cases where the number of lines in the display structure 1401 is smaller than the number of lines in the display space 1712, the module completes the contents of the display space in the video memory with nil characters 902. The character attribute of the line of the display space indicated by the current line number 1707 is put in inverse video mode, meaning that within the byte of the character attribute, the color for the font is used as the color for the background and vice versa. The display module allows the user to select these colors with the color selection module. This is done using a rainbow of colors for the font and another for the background, or by using a matrix of all possible combinations. The number of lines of the display space 1712 being smaller than the number of lines to display 1401, the module indicates to the user if lines precede the first line displayed by showing an arrow pointing towards the top on the right upper corner of the frame of the display window 1715 if the pointer to the first element displayed from the list 1414 is different than the pointer of the first element of the list 1412 and by showing an arrow pointing towards the bottom at the bottom right corner of the frame of the display window 1716 if the pointer of the first element displayed from the list 1414 is different than the pointer to the first element displayed when the last element of the list is displayed 1416. If the pointer to the first element displayed from the list 1414 equals the pointer to the first element of the list 1412 or equals the pointer to the first element displayed when the last element of the list is displayed 1416, then the corresponding indicator is removed by copying the character of the frame located on the same line on the left column 1709, which implies that the same step is done for any character used for the frame. The module uses this type of process inside the video memory to have grater compatibility with other systems and for the increased processing speed.

Then, the module waits for the user to press a key on the keyboard. As long as the user uses display keys, the display module is in function. Depending of the key chosen, the display is modified.

The current line number 1707 can be modified inside the limits of the first line number of the display space 1713 and the last line number of the display space 1714. Before each modification to the current line number 1707, the attribute of each of the characters in the video line indicated by the current line number are put back in normal video mode and, after each modification to the current line number 1707, the attribute of each of the characters of the video line which are indicated by the current line number are put in inverse video mode. This operation is done by the same function in both cases, this function uses the bit-wise operators left shift, right shift, and inclusive OR to modify the value of the byte attribute. Before doing this operation, to prevent the repetition of this process in the case that the key is pushed continuously and to prevent a blinking of the screen which is unpleasant to the user, the module verifies that the current line number 1707 is different than the first line number of the display space 1713 or than the last line number of the display space 1714, depending on the case. The pointer to the current element 1411 is maintained to the line of the display structure corresponding to the line of the video screen for which the character attribute is in inverse video mode and which corresponds to the current line number 1707.

The content of the display space can be modified, moving the content of the lines from right to left or from left to right by changing the number of the first character 1415, or moving the lines up and down.

When the modification of the display necessitates only the modification of one line of the video memory, the content of the video memory is modified by moving, one by one, inside the display space of the window, either the characters of the line which precedes starting with the last line number in the display space 1714 until the first line number of the display space plus 1 1717 or the characters of the line that follows starting with the first line number in display space 1713 until the last line number of the display space minus 1 1718. The processing being done inside the RAM video memory increases the speed of processing. The pointer to the first element displayed from the list 1414 is initialized, either to the pointer of the PREVIOUS element 1404, or to the pointer of the NEXT element. Only the characters of either the first line number of the RAM or of the last line number are transferred from the display structure, that is, those of the line of the current element 1411. In "scroll lock mode" the characters transferred from the display structure are either those of the line of the pointer of the first element displayed from the list 1414 or those of the line corresponding to the pointer of the first element displayed from the list 1414 plus the number of lines of the display space 1712 minus 1.

When the modification of the display requires the modification of the whole video memory, the display module modifies the pointer to the first element displayed from the list 1414 and fills in the display space of the video memory 1712, character by character, by introducing the content of the display structure 1401 from the number of the first character 1415 of the line pointed to by the pointer of the first element displayed form the list 1414. The pointer of the first element displayed from the list 1414 can be initialized directly to the pointer of the first element 1412, to the pointer of the first element displayed when the last element of the list is displayed 1416, or incremented to the pointer of the NEXT element or decremented to the pointer of the PREVIOUS element according to the number of lines of the display space 1712 minus 1, in order to leave a trace for the user. Before doing this modification, the module verifies that the pointer of the first element displayed from the list 1414 is different from the pointer of the first element 1412 and of the pointer of the first element displayed when the last element of the list is displayed 1416 to prevent unuseful repetition of this process if the key is pushed continuously. Any modification of the pointer of the first element displayed from the list 1414 must be done inside the pointer of the first element of the list of pointers 1412 of the structure to display and the pointer of the first element displayed when the last element of the list is displayed 1416.

Leaving the display module, the values of the pointer of the first element displayed from the list 1414, of the pointer of the current element 1411, of the current line number 1707 and of the last key pushed are transferred. The display module can be controlled to provide a successive selection.

Printing of the reports 206 is done by the printing module. This module receives the pointer of the first element of the list of pointers 1412 and transfers to the printer, character by character, line by line, 80 characters per line until the last character of the last line, unless the user presses on a key to interrupt this transfer, the character of the element of its conversion vector corresponding to the index of the ASCII code of the character in the display structure.

TABLE 3 for (j=0; j<79; j + +)
    put c (VC [cour I ->L ptr->LINE [j] ].stdprn);

The conversion vector is initialized as follows:

TABLE 4

BYTE VC[256]; /* Conversion Vector */
    /* init conversion Vector */
    for (j = 0; j <32; j + +)
        VC [j] = 32;
    for (j = 32; j<127; j + +)
        VC [j] = j;
    for (j =127; j <256; j + +)
        VC [j] = 32;
    VC [128] = 67;
    VC [129] = 117;
    VC [130] = 101;
    VC [131] = 97;
    VC [132] = 97;
    VC [133] = 97;
    VC [134] = 97;
    VC [135] = 99;
    VC [136] = 101;
    VC [137] = 101;
    VC [138] = 101;
    VC [139] = 105;
    VC [140] = 105;
    VC [141] = 105;
    VC [142] = 65;
    VC [143] = 65;
    VC [144] = 69;
    VC [147] = 111;
    VC [148] = 111;
    VC [149] = 111;
    VC [150] = 117;
    VC [151] = 117;
    VC [152] = 121
    VC [153] = 79;
    VC [154] = 85;
    VC [250] = '\ f'; /* code used by Form Feed */
    /* */

Therefore, only the ASCII codes 32 to 126, which are standard to all printers, are transferred to the printer. No installation step is necessary before using the financial statement module but the conversion vector can be reinitialized by the user for specific printers.

While consulting the report of a financial statement of which an example is shown at FIG. 18, the user can select a line and obtain detailed information 208. The first level of detail is the detail of an item 1901 which is obtained by inserting, in the display structure 1401 and in the list of pointers 1409 an element 1417 for each element in the sub-list item 1014 of the item selected. The module saves the pointer of the chart structure 1011 of each element in the display structure 1418 and displays the modified report

1900. The user can manipulate the display and print the document or select a balance to obtain the detail of this balance.

The detail of the balance shown in FIG. 20 will be displayed if the pointers of the display line of the first transaction 1027 and of the display line of the last transaction 1028 linked to the account of the chart structure corresponding to the pointer of the chart structure saved in the display structure 1418 of the line selected are not nil.

To obtain this detail, the financial statement module has built, in the central memory 308, the transaction data structure 2201 and linked the transaction to the accounts of the chart structure 1002. The transaction structure 2201 is doubly linked with the pointers NEXT 2202 and PREVIOUS 2203 inside of the structure, since a distinct list in the other structures is not necessary.

To link the transaction to the corresponding account of the chart structure 1002, the financial statement module stores its LINKTRANS 1010 in the field LINKCHART 2208 of the transaction structure. The LINKCHART which corresponds to the LINKTRANS of the chart structure, is the index of the LINK vector 1020 where is found the pointer of the chart structure for the allocation account of this transaction. The transaction comes from step 312 or step 307.

In order to respect accounting principles, any trial balance must be regularized before being presented as a financial statement. In order to do so, the user uses the data entry screen 312 to create transactions, that is general journal entries for regularization purposes and/or presentation in the central memory and the external memory. It happens every so often that new accounts need to be created for these entries. The user then uses data entry screen 305 to add accounts to the trial balance.

Figure 24:
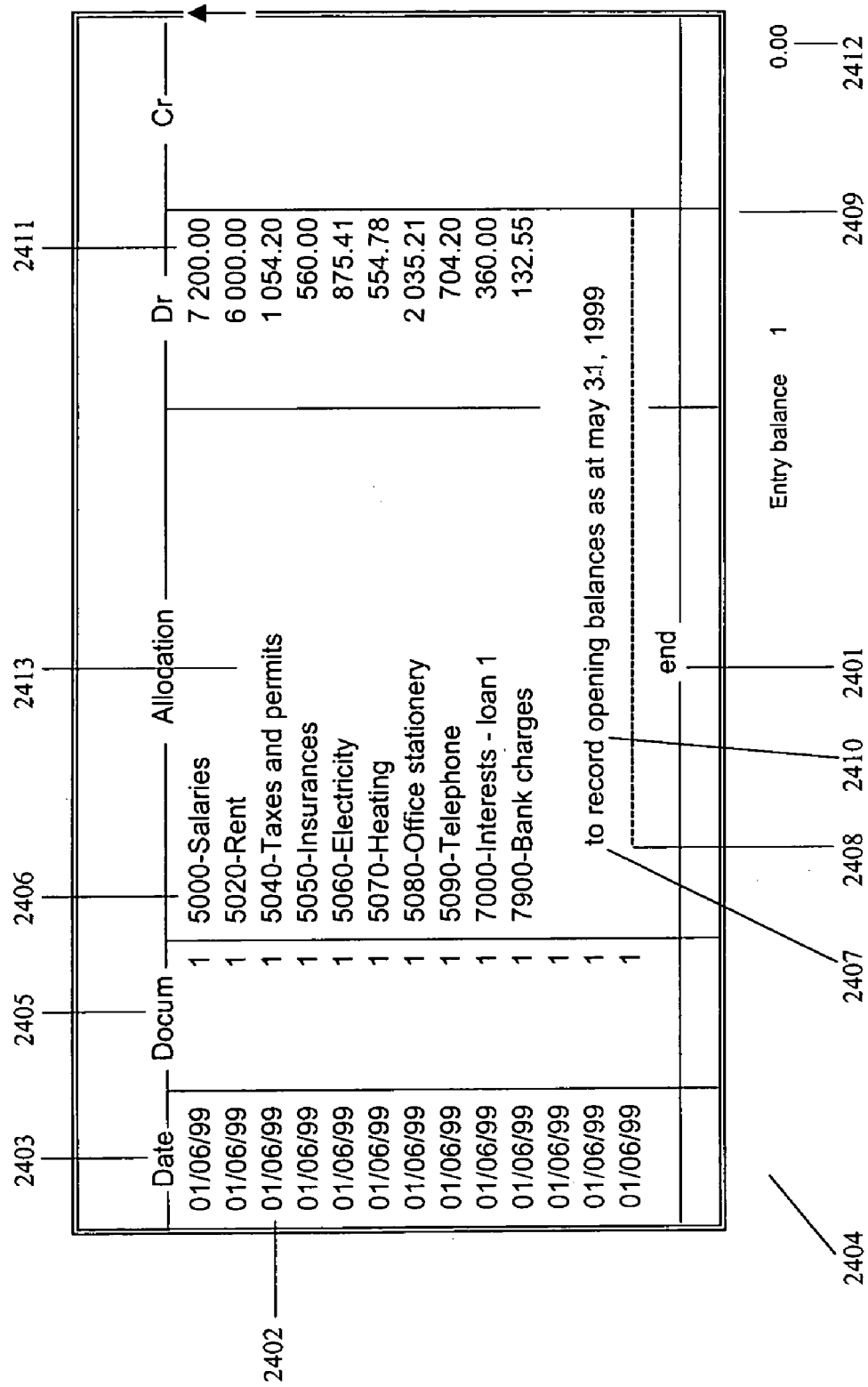
FIG. 24 is a screen display showing the input screen for the general journal.

FIG. 24 shows the data entry screen for typing in general journal entries. The manipulation of the screen is done with the display module. The user positions the cursor on the line above which he wants to insert an new line. Note that a line called END 2401 is the temporary element added to the end of the list, before the display on the screen, in order to permit the insertion at the end of the list with the insertion algorithm as explained previously. The user can also destroy an existing line or modify its content by getting into the insertion mode. A default date is displayed in three sections DD/MM/YY 2402. The default date is the date of the preceding line. If it is the first line, the default date is today's date. Each portion of the date can be modified using the keys plus (+) or minus (−) or with numbers. A calendar can be displayed by pressing the key "." which is the only key on the numerical keyboard which is not used in the date field. A date can be selected in the calendar and transferred in the date field. In order to save display space, the year portion of the date 2403 does not include the first two digits. The year portion can be modified only with the keys plus (+) or minus (−) to make sure, changing to a new millennium, that the first two digits not shown will correspond to this new millennium. The complete date "Monday, Jun. 1, 1999" is displayed in the message line 2404. The entry number 2405 of the preceding line is displayed by default and can be modified using the keys plus (+) or minus (−) or by inserting the number.

The next steps consists of selecting the allocation account for the transaction 2406 or the comment option 2407. An element is added at the beginning of the list of the chart structure 1002 with a "COMMENT" tag. The chart of accounts is displayed with the display module as shown in the window 802 for the selection of the account. The number and the title (truncated before the last three characters but appearing in full in the message line 2404) of the selected account is entered in the allocation field. The user can include comments 2407 simply by selecting, for the allocation account, the first line of the window of the chart, that is, the "COMMENT" line. The cursor is then positioned at 2408, the length of the field is limited by the line which separates columns Dr for debit and Cr for credit 2409. The user can insert a separation character, for example, a dash at position 2408 followed by enter and this character will be repeated automatically for the full length of the field 2410. A comment line is stored in a line of the transaction structure and a display line as with any other transaction which makes it easier to process some operations, such as the insertion of these lines on the detail of a balance report as shown in FIG. 20, in a very efficient way without needing any additional memory space. A comment line is identified by the journal number 5 in the transaction structure 2209, and the fields 2219 and 2208 are initialized to nil.

The insertion of the amount to debit or credit in the allocation account is simply done by typing in the amount in the right column. Only one amount per line is allowed. A calculator is accessible with the plus (+) key. The result of these calculations can be transferred in the field of the amount. A tax calculation module is also accessible with the key "*". The total of the debits minus the total of the credits for a document (same date and same number) must be zero 2412 in order to be able to quit the data entry screen. The insertion mode for the next lines is active as long as the user doesn't leave it.

In the transaction structure, the transaction date 2204 is stored in Julian date format. The Julian date corresponds to the number of days since the beginning of our era. It is calculated by multiplying the number of years by 365 to which result is added the number of additional days for each of the previous leap years, calculated by dividing by four the number of years minus one to which result we add the number of days for each of the months of the current year and are careful in calculating 29 days for the month of February if the current year is a leap year, that is, if what remains of the division of the current year by four equals zero, to this result we add the number of days for the current date. Processing transactions by intervals of dates is then very fast.

The document number 2205 is stored in a whole number to facilitate comparison tests when searching for transactions which are part of a document. A document comprises transactions having the same document number and the same date. Therefore, a debit amount can be credited to more than one account and vice versa. This is the multi-allocation. The amount stored as a floating point number 2207 is always positive. Its accounting direction, debit or credit, is stored in the journal field 2209 of the transaction structure. A value of 3 indicates that the allocation account is debited of the whole amount. A value of 4 indicates that the allocation account is credited by the amount.

For each line in the transaction structure, a line in the display structure 2210 is created to which the pointer is stored in the transaction structure 2211. This pointer, except for comment lines, is also stored in an element of a distinct, doubly linked list of pointers 1030 called a sub-list because the pointer of the first element and the pointer to the last element are stored in the chart structure 1027, 1028 to link the transaction to its allocation account. If these pointer are not nil for the selected account, the detail of its balance can be displayed. The information which is found on each display line of the transactions 2210 combines the data from the chart structure 1002 and the transaction structure 2201.

The account number 2212 comes from the element of the chart structure 1002 pointed to by the pointer of the LINK vector 1020 located at the LINKCHART element 2208 of the transaction structure. The date 2213, the document number 2214, the description 2215 and the amount 2216, always positive, come from the transaction structure. The pointer to the element, added with the insertion algorithm, to the sub-list 1030 is stored in the display structure 2217. The display structure also stores the pointer to the transaction structure to which it is linked 2218. Keeping a transaction structure instead of just a display structure in the central memory, allows not only to combine easily data from the chart structure and the transaction structure for display purpose but also to permanently have access to data formats needed for a rapid process as, for example, the selection by dates or by document number, and the mathematical calculations. It also allows to edit the display according to the detail option as will be explained, without needing additional space in the central memory for temporary saves.

As described earlier at step 307, accounting transactions listed on transactions reports printed on disk by accounting software can be read by the financial statement module. For each accounting entry, the financial statement module uses the number of the account or the title of the account, available on all transactions reports, to link the transaction to the corresponding account of the chart structure 1002 by storing its LINKTRANS 1010 in the field LINKCHART 2208 of the transaction structure. The LINKCHART, which corresponds to the LINKTRANS of the chart structure, is the index of the LINK vector 1020 where is found the pointer of the chart structure for the allocation account of this transaction. The financial statement module uses the other available data, which is in fact almost standard for all accounting transactions, to store the date of the transaction 2204, the document number 2205 (initialized to nil if none), a description of the transaction 2206 (initialized to nil if none), and the amount 2207 with its direction (debit or credit). The amount stored is always positive. Its accounting direction, debit or credit, is stored in the journal field 2209 of the transaction structure. A value of 3 indicates that the allocation account is debited of the whole amount. A value of 4 indicates that the allocation account is credited by the amount. The financial statement module loads as much accounting transactions as possible in the central memory of the computer 1700. The financial statement module dynamically allows memory space and, because the capacity of the central memory varies according to the computer used, the number of transactions loaded in the computer will vary according to what type of computer is used.

Figure 23:
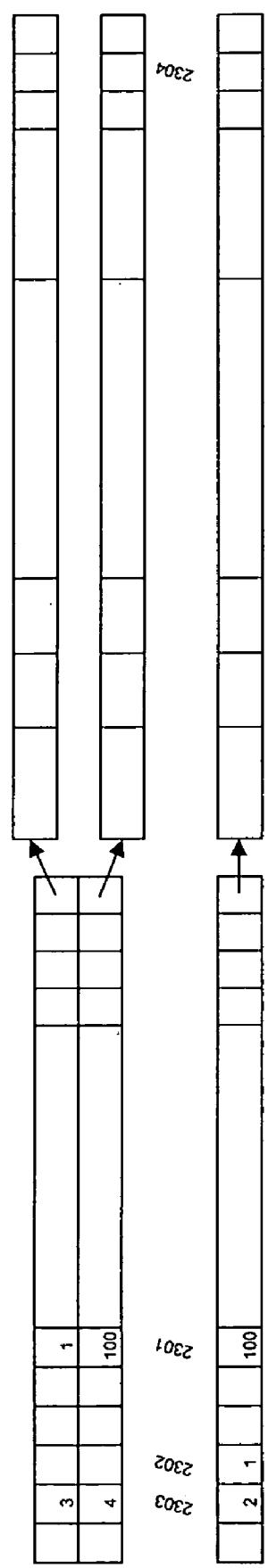
FIG. 23 illustrates the optimization of the accounting data.

To maximize the use of this capacity, the financial statement module, because of the organization of the data in the memory, can optimize the loading in of the transactions by representing the debit line and the credit line of a transaction on only one transaction line and only one display line as shown in FIG. 23 and therefore doubles the number of transactions which can be loaded in the central memory. For each amount, the LINKTRANS 1010 of the allocation account is saved in LINKCHART 2301 of the transaction structure. The double entry accounting principle requires a debit and a credit. In the data for each transaction, the date, the document number, the description, and the amount is the same for the debit and the credit part. Only the allocation account changes. And, for the majority of transactions recorded in an accounting system, except for the general journal entries, the transactions are linked to one or a few control account for one of the two portions, for example, a bank account, an account receivable, an account payable, etc. Therefore, for the majority of transactions, there exists one or a few common denominators. By identifying these few control account by the direction "B" in the direction of the account 1029 in the chart of accounts with the data entry screen 305, the financial statement module can link the debit and the credit of a transaction in the accounting data by the date and the document number, the description and the amount if necessary, and initializes the LINKBANK 2302 of the transaction structure which corresponds to the LINK-TRANS of the chart structure, that is, the index of the LINK vector 1020 where the pointer of the chart structure of the control account for the transaction is.

The pointer of the line of the display structure 2210 stored in the transaction structure 2211 is also stored, as for the allocation account, in an element of a distinct list of pointers which is doubly linked and called sub-list because the pointer of the first element and the pointer of the last element are stored in the chart structure 1027, 1028 to link the transaction to the control account. The pointer of the element added with the insertion algorithm to the sub-list 1030 is saved in the display structure 2304.

The amount is always positive. Its accounting direction, debit or credit, is stored in a journal field 2303 of the transaction structure. A value of "1" indicates that the allocation account 2301 is debited of the amount and the control account 2302 is credited of the amount. A value of "2" indicates that the allocation account 2301 is credited of the amount and the control account 2302 is debited of the amount.

The detail of a balance is obtained by going through the sub-list of display structure pointers 1030 from the pointer to the display line of the first transaction 1027 until the pointer to the display line of the last transaction 1028 linked to the account of the chart structure corresponding to the pointer of the chart structure stored in the display structure 1418 of the line selected. For each element of the sub-list, a similar element is created and inserted in a distinct list of display structure pointers as in 1409 to assemble a report as shown in FIG. 20 containing the list of transactions comprised in the balance of the account. The display structure pointer for each element of the distinct list is initialized to the one contained by the element of the sub-list. Each element of the distinct list is added at the end of the list with the insertion algorithm. The processing of the information is fast and does not need much additional memory in order to create this report showing the detail of the balance. If the user chooses to display the transactions in a sorted manner, each element of the distinct list is inserted, with the insertion algorithm, according to the date of the transaction, the document number, or the amount, instead of being added at the end of the list, so no sorting of the transactions is necessary to provide this sorted presentation.

For each display line containing an amount 2001, the amount 2207 of the corresponding element of the transaction structure 2218 is accumulated for the presentation of the balance 2002 at the end of the report. For this calculation, the sign of the amount is determined according to the journal 2209 of the transaction as for the accounting direction. If the journal is 1 or 3, the sign is positive and the accounting direction is debit. If the journal is 2 or 4, the sign is negative and the direction is credit. However, in the case where the transaction structure has been optimized, if the display lines of the transactions are linked to the account selected 2008 in the report 1900 for a detail of the balance because the LINKTRANS 1010 of the selected account corresponds to the LINKBANK 2302 instead of corresponding to the LINKCHART 2301 of the transactions, then the sign and the accounting direction are inverted. For the presentation, in addition to indicating the direction D for debit or C for credit for the transaction 2003 in the presentation, the financial statement module displays a "+" 2004 or a "−" according to the direction of the account 1029 to facilitate the comprehension of the effect of the transaction on the balance of the account. The direction of the account shown 2005 is attributed during the building of the chart structure 304 from the accounting data and can be modified by the user in the data entry screen of the trial balance 305. As explained earlier, with the accounting equation of FIG. 15, a transaction debiting an account for which the direction is debit displays a "+". As well, a transaction crediting an account for which the direction is credit displays a "+". A "−" is displayed when the direction of the transaction is different from the direction of the account, for example, in the case of a transaction crediting an account for which the direction is debit or a transaction debiting an account for which the direction is credit.

The balance carried over 2006 corresponds to the amount 1025 stored in the chart structure and which comes from the data entry screen 305 or from the balance carried over and calculated for the transactions, previous to the date of the report and saved in distinct files on an external memory unit 310 during the step 309 when the number of transactions is greater than the capacity of the central memory of the computer used. The user can load in 311 these transactions in the central memory to obtain the detail of a balance carried over. In order to provide this functionality, the number of elements of the vector LINK 506 is cumulative and the destruction of an account does not reallocate the element of the vector. The date of the report is stored in the file MASTR.DAT 1102 as well as the number of files 1103 which were created.

If the transaction is a general journal entry, its display line is modified to fit in the presentation of the detail of a balance. Therefore, the title of the allocation account 2413 is replaced by the mention "Reference: GENERAL JOURNAL" 2007 and the amount 2411, debit or credit, is moved to the end of the line. If the user so wishes, this display line can be replaced by the comment lines 2407 related to the journal entry. The module then finds the first line of the comment, different from a blank line, which follows this journal entry in the transaction structure and puts it in the display line instead of putting the mention "Reference: GENERAL JOURNAL", and then appends the other comment lines related to the journal entry.

In the case where the transaction structure has been optimized to have the credit and debit on a single transaction line and a single display line, the display line shows the account number of the allocation account. If the account for which the balance is detailed 2008 corresponds to the allocation account of the transaction, that is, if the LINKTRANS 1010 of the selected account corresponds to the LINKCHART 2208 of the transaction, the account number 2009 is modified to indicate the counterpart, the control account, the one that its LINKTRANS 1010 corresponds to the LINKBANK 2302 of the transaction. If it is not optimized, the counterpart will be seen in the detail document.

Also, in the case where the transaction structure has been optimized, the financial statement module can group rapidly, without any sorting, the transactions by allocation account, if the detail of a balance is requested for a control account or by control account if the detail of the balance of an allocation account is requested and by journal entries and can calculate a total for each group. The module will sweep through the chart structure 1002 from the first element to the last element without considering the account for which the detail is requested. For each account of the chart structure 1002, it will verify if there are transactions in the detail of FIG. 20 by comparing the LINKCHART 2301, or the LINKBANK 2302 if grouped by control accounts, of each transaction line with the LINKTRANS 1010 of the current account of the chart structure. If they are equal, then the element is retrieved from the list of pointers of the transaction display lines and is added in another distinct list of display line pointers, by inserting at the end of the list with the insertion algorithm. At the end, after sweeping the chart structure, if the first list, the list of the account balance detail of FIG. 20, is not empty, either because the transactions left have an allocation account (LINKCHART) corresponding to the account for which the detail is requested, which have been skipped, or because, in the case where the account for which a detail is requested is an allocation account, the LINKBANK is nil, therefore not grouped, because none of the accounts in the chart have a nil LINKTRANS, the remaining transaction display lines are journal entries or comments if the user has chosen this option and are added at the end of the second list.

To finish the list of transactions, a last line composed of a page jump 1406 is added to the list. The module stores the pointer to the first element 1407 and the pointer to the last element 1408 of this list 1402. The list then goes through the skeleton of reports of FIG. 16 to build a report to display and print by adding headers and page jumps inside of the list of the display structure. The user can manipulate the display, print the document of FIG. 20, come back to the previous detail level, or select a transaction to obtain the details, that is, the detail document which lists the transactions which compose this document as shown in FIG. 21.

FIG. 21 shows the presentation of the detail of a document. In this case, the transaction structure has been optimized. In the other case, the presentation would be of the type of FIG. 24, with the Debit and Credit columns.

The module looks in the transaction structure 2201, for the first transaction and the last transaction which build this document, that is, the transactions having the same date and the same document number, starting from the transaction pointer saved in the display line 2218. The module then builds a distinct list of display pointers from the display line pointers saved in the transaction structure 2211 and calculates a total for the document 2101. The report contains a line to display the control account 2102. The user can request a light presentation. In the light presentation, the date 2103 and the document number 2104 being identical for all transactions, will only appear on the first transaction line. To finish the list of transactions, a last line comprising a page jump 1406 will be added to the list. The module will save the pointer to the first element 1407 and the pointer to the last element 1408 of the list 1402. The list will then go through the skeleton of reports of FIG. 16 to build the report to display and print by adding the header and the page jump inside of the list of the display structure. The user can manipulate the display, print the document or come back to the previous level of detail.

As can be seen, because of the data structures of the present embodiment, with the distinct lists of pointers, it is possible to build any type reports containing transactions and to display it with the display module.

In the case where the transaction structure has been optimized and the control accounts have been identified, the detail of a balance of an account as shown in FIG. 20 groups debits and credits. It is possible to obtain, for a control account, a report containing just the debits or a report containing just the credits, simply by going through the transaction structure in search of all transactions comprised in the date interval chosen, which have a journal 2209 equal to "1" if the credits of the control account are required, or equal to "2" if the debits are required, and for which the LINKBANK 2302 corresponds to the LINKTRANS 1010 of the control account elected. A light presentation can be requested. In the light presentation, the date 2103 and the account number document 2104, being identical for all transactions of one document, and the description 2105, if it is also identical, will only appear on the first transaction display line of the document. A total for each document can be requested. In that case, the total is added between the description and the amount of the last display line of the document. No additional display line is necessary. The process only requires to modify the display lines already available which can be reinitialized after the processing, using the transaction structure. The financial statement module can also rapidly group, without doing sorting, the transactions by allocation accounts and calculate a total for each group, if the user so desires, processing as explained earlier for the account balance detail report.

In the case where the transaction structure has been optimized and that control accounts have been identified, it is possible to obtain a report containing all the debits and the credits by having the module go through the transaction structure and look for all the transactions comprised in the date interval chosen which have a journal entry 2209 equal to "1" and to "2" and for which the LINKBANK 2219 corresponds to the LINKTRANS 2305 of the control account selected. This report can be used for verification purposes for example, by the reconciliation module of FIG. 25, which lets the user check each one of the transaction lines in the case where the user wants to compare with a document such as a bank statement. The calculation unit 2501 displays a theoretical balance 2502 calculated from the balance 2503 of the control account 2504 at a chosen date 2509, in which balance the amounts of the transactions listed are included, plus the total of credits that have not been checked 2505 minus the total of debits that have not been checked 2506. So, instead of going by reconciliation, from the bank statement balance to a reconciliated or theoretical book balance for the account, the calculation unit uses the book balance of the account to calculate and display a theoretical bank statement balance throughout the process of checking the transactions. With this, the user does not have to wait for the printing of the reconciliation report to know if the balance of the account in the books has been reconciliated successfully with the balance of the bank statement, and to go back to the checking process if not, and so on. When this theoretical balance equals the bank statement balance, the user knows that he has succeeded in his verification task and can then print the reconciliation report. Since a document can contain many transaction lines, when the transactions are checked, the user has to ensure that the total of the lines checked of the document 2507 equals the total of the document 2508. Since the display module can be controlled to provide a successive selection, in the case of the reconciliation module, it is sufficient to maintain the key pushed for the lines to be checked in a successive manner.

The financial statement module can be integrated with a word processor. It would then be used to build complete financial statements with the report, the complementary notes and the additional information using a trial balance. The financial statement module would be included to existing word processors. The user would prepare the formatting of the reports and would call secondary data entry windows when wanting to include accounting data. The financial statement module would process the accounting data as previously described and would include the right amounts inside the reports, created by the user, with windows available as shown in FIG. 26. This feature would be highly useful to produce reports with customized formatting.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A computer implemented method for building financial statements, the method comprising:
   receiving accounting data having a plurality of amounts, wherein each amount has an accounting direction and a corresponding account;
   processing an account balance resulting from one or more transactions, and each transaction is associated with more than one account and combines at least one debit and at least one credit;
   manually grouping the accounts from a user display into one or more financial statement items, wherein each account is associated with only one financial statement item within any one financial statement and wherein said grouping is regardless of an account sequence;
   computing a financial statement item balance for each financial statement item based on the associated accounts and their respective account balances;
   manually grouping the financial statement items from said user display into one or more totals, wherein each total is based on preceding financial statement item balances; and
   providing a financial statement that includes each financial statement item and its respective balance.

2. The method of claim 1 further comprising:
   providing, from said user display of the financial statement, a first level of detail for a user selected financial statement item on said user display, the first level of detail including any accounts and respective account balances grouped into that financial statement item.

3. The method of claim 2 wherein each accounts is assigned an accounting direction, and said account balance is provided in parentheses if its direction is opposite the assigned accounting direction of that account.

4. The method of claim 2 further comprising:
   providing, from said accounts and respective account balances grouped into the user selected financial statement item on the user display, a second level of detail for a user selected account on said user display included in the selected financial statement item, the second level of detail including said account balance and transactions associated with the account balance.

5. The method of claim 4 wherein providing the second level of detail includes providing for at least one of form feeds and headers as required.

6. The method of claim 4 further comprising:
   providing, from said account balance and transactions associated with the account balance, a third level of detail for a user selected transaction included in the selected account on said user display, the third level of detail including at least one debited account and a corresponding credited account associated with the selected transaction.

7. The method of claim 1 wherein each financial statement item is assigned an accounting direction, and a financial statement item balance is provided in parentheses if its direction is opposite the assigned accounting direction of that financial statement item.

8. The method of claim 7 wherein the assigned accounting direction of a financial statement item is based on a direction associated with a first grouped account of the financial statement item.

9. The method of claim 1 wherein receiving accounting data further comprises at least one of:
reading trial balance data stored on a computer readable medium; and
reading transactions stored on a computer readable medium.

10. The method of claim 1 wherein the method is integrated into accounting software.

11. The method of claim 1 wherein the method is integrated into at least one of word processor software, spreadsheet software, and editing software.

12. The method of claim 1 wherein providing a financial statement includes displaying at least one level of detail associated with any financial statement item balance to a user, wherein said displaying uses sub-lists of pointers.

13. The method of claim 1 further comprising:
dynamically allocating central memory spaces for a plurality of doubly linked data structures for storing elements of the accounting data, wherein the allocating is performed for each data structure element and returning an individual central memory address called a pointer, the data structure being doubly linked by the storage of the pointer of a next element and the pointer of a previous element in the data structure element.

14. The method of claim 1 further comprising:
dynamically allocating central memory spaces for a trial balance data structure for storing the accounts of the accounting data, and linking trial balance data structure elements with a doubly linked list of pointers thereby allowing sub-lists of pointers to group the accounts into financial statement items; and
dynamically allocating central memory spaces for a financial statement data structure for storing the financial statement items, and linking financial statement data structure elements with a doubly linked list of pointers thereby allowing sub-lists of pointers to group financial statement items into totals.

15. The method of claim 14 wherein dynamically allocating central memory spaces for the trial balance data structure further includes storing trial balance data into trial balance data structure elements, each of said trial balance data structure elements including a LINKTRANS field, storing a corresponding LINK vector element sequential number, each element of the LINK vector being a central memory address of the trial balance data structure elements.

16. The method of claim 14 wherein dynamically allocating central memory spaces for the financial statement data structure farther includes storing financial statement data structure elements, the financial statement data structure elements including a LINE type field for each element of the financial statement, each LINE type field specifying a type attributed to the corresponding financial statement data structure elements.

17. The method of claim 16 wherein the type that can be specified in the LiNE type field include two types of balances provided in the financial statement, namely a financial statement item type and a total type.

18. The method of claim 1 wherein grouping the accounts into one or more financial statement items includes using doubly linked sub-lists of trial balance data structure element pointers, the pointer of a first element of each of these lists of pointers being stored in a financial statement data structure.

19. The method of claim 1 wherein grouping the financial statement items into one or more totals includes using doubly linked sub-lists of financial statement data structure element pointers, a pointer of a first element of each of these lists of pointers being stored in a financial statement data structure.

20. The method of claim 14 further comprising:
maintaining a direction field in the trial balance data structure for each account, the direction field specifying an accounting direction thereby enabling a user to identify a transaction amount's effect on the corresponding account balance.

21. The method of claim 1 further comprising:
generating a report including form feeds and headers as required for each page of the report.

22. The method of claim 1 further comprising:
dynamically allocating central memory spaces for a doubly linked transaction data structure for storing transactions associated with the accounts, and linking the transactions to their respective accounts.

23. The method of claim 22 wherein dynamically allocating central memory spaces for the doubly linked transaction data structure further includes storing transactions into transaction data structure elements, each of said transaction data structure elements including a L1NKCHART field, storing an associated LiNK vector element sequential number, each element of the LINK vector being a central memory address of the trial balance data structure elements.

24. The method of claim 23 wherein an accounting direction for each transaction amount is specified in a corresponding JOURNAL field included in the transaction data structure.

25. The method of claim 23 wherein storing transactions into the doubly linked transaction data structure further includes dynamically allocating central memory spaces for displayline data structure elements, each of said displayline data structure elements associated with a corresponding transaction data structure element.

26. The method of claim 25 further comprising:
generating an account balance detail report using a doubly linked list of displayline data structure element pointers, thereby allowing sorted presentation of the transactions included in an account balance detail report.

27. The method of claim 23 wherein storing transactions into the doubly linked transaction data structure further includes linking each element of the transaction data structure to a corresponding element of the trial balance data structure with a doubly linked sub-list of displayline data structure element pointers, a pointer of the first element of this list being stored in a trial balance data structure element.

28. A computer implemented method for building financial statements, the method comprising:
receiving an electronic file ci accounting data having a plurality of amounts, wherein each amount has an accounting direction and a corresponding account;
processing an account balance resulting from one or more transactions, and each transaction is associated with more than one account and combines at least one debit and one credit;

manually grouping the accounts from a user display into one or more financial statement items, wherein each account is associated with only one financial statement item within any one financial statement and wherein said grouping is regardless of an account sequence;

computing a financial statement item balance for each financial statement item based on the associated accounts and their respective account balances;

storing the financial statement items into a financial statement data structure, the financial statement data structure including a LINE type field for each line of a financial statement, each LINE type field specifying a type attributed to the corresponding financial statement line, with the types including a financial statement item type to designate financial statement items and a total type to designate financial statement items manually grouped from said user display into a total; and providing the financial statement that includes each financial statement item and its respective balance.

29. A computer implemented method for building financial statements, the method comprising:

receiving accounting data having a plurality of amounts, wherein each amount has an accounting direction and a corresponding account;

processing an account balance resulting from one or more transactions, and each transaction is associated with more than one account and combines at least one debit and one credit;

dynamically allocating central memory spaces for a trial balance data structure for storing the accounts of the accounting data, and linking trial balance data structure elements of the trial balance data structure with a doubly linked list of pointers thereby allowing manual grouping of the accounts from a user display into financial statement items using sub-lists of pointers, wherein each account is associated with only one financial statement item within any one financial statement and wherein said grouping is regardless of an account sequence;

manually grouping the accounts from said user display into one or more financial statement items;

computing a financial statement item balance for each financial statement item based on the associated accounts and their respective account balances;

dynamically allocating central memory spaces for a financial statement data structure for storing the financial statement items, and linking financial statement data structure elements of the financial statement data structure with a doubly linked list of pointers thereby allowing manual grouping of financial statement items from said user display into totals using sub-list of pointers;

manually frouping the financial statement items from said user display into one or more totals, wherein each total is based on preceding financial statement items balances; and providing a financial statement that includes each financial statement item and its respective balance.

30. The method of claim 29 wherein dynamically allocating central memory spaces for the trial balance data structure further includes storing trial balance data into trial balance data structure elements, each of said the trial balance data structure elements including a LINKTRANS field, storing a corresponding LINK vector element sequential number, each element of the LINK vector being a central memory address of the trial balance data structure elements.

31. The method of claim 29 wherein dynamically allocating central memory spaces for the financial statement data structure elements further includes storing financial statement items into the financial statement data structure elements, the financial statement data structure elements including a LINE type field for each line of the financial statement, each LINE type field specifying a type attributed to the corresponding financial statement line, the types including a financial statement item type and a total type.

32. The method of claim 29 further comprising:

dynamically allocating central memory spaces for a doubly linked transaction data structure for storing transactions associated with the accounts, and linking the transactions to their respective accounts.

33. The method of claim 32 further comprising:

optimizing allocation of central memory spaces for storing transactions included in the accounting data by storing a debited account and a corresponding credited account in a single element of the transaction data structure, as well as in an associated element of a displayline data structure element, thereby reducing the number of central memory spaces that must be allocated for storing transactions.

34. The method of claim 33 further comprising:

maintaining a direction field in the trial balance data structure for each account, the direction field specifying which accounts have been identified as control accounts during the optimizing.

35. The method of claim 33 further comprising:

computing a theoretical account balance during transaction checking processes; and displaying the theoretical account balance throughout the transaction checking processes, thereby eliminating a need to print reconciliation reports during these transaction checking processes to establish whether said account balance has been reconciled successfully.

36. The method of claim 33 wherein dynamically allocating central memory spaces for the doubly linked transaction data structure further includes storing transactions into transaction data structure elements, each of said transaction data structure elements including a LINKBANK field, storing an associated LiNK vector element sequential number, each element of the LINK vector being a central memory address of the trial balance data structure elements.

37. A method for organizing accounting data in data structures used for building financial statements, the method comprising:

receiving accounting data, the accounting data including a plurality of amounts, wherein each amount has an accounting direction and an account, dynamically allocating central memory spaces for a trial balance data structure for storing accounts included in the accounting data, and linking trial balance data structure elements with a doubly linked list of pointers thereby allowing manual grouping of the accounts from a user display into financial statement items using sub-lists of pointers, wherein each account is associated with only one financial statement item within any one financial statement and has a computed account balance resulting from one or more transactions, and each transaction is associated with more than one account and combines at least one debit and at least one credit and wherein said grouping is regardless of an account sequence;

manually grouping the accounts from said user display into one or more financial statement items;

dynamically allocating central memory spaces for a financial statement data structure for storing the financial statement items, and linking financial statement data structure elements with a doubly linked list of pointers thereby allowing manual grouping of financial statement items from said user display into totals using sub-lists of pointers;

manually grouping the financial statement items from said user display into one or more totals, wherein each total is based on preceding financial statement items balances; and storing financial statement items into the financial statement data structure, the financial statement data structure including a LINE type field for each line of a financial statement, each LINE type field specifying a type attributed to the corresponding financial statement line, the types including a financial statement item type and a total type; and providing a financial statement that includes each financial statement items and its respective balance.

38. The method of claim 37 wherein dynamically allocating central memory spaces for the trial balance data structure further includes storing trial balance data into trial balance data structure elements, each of said trial balance data structure elements including a LINKTRANS field, storing a corresponding LINK vector element sequential number, each element of the LINK vector being a central memory address of the trial balance data structure elements.

39. The method of claim 37 further comprising:
dynamically allocating central memory spaces for a doubly linked transaction data structure for storing transactions associated with the accounts, and linking the transactions to their respective accounts.

40. The method of claim 39 wherein dynamically allocating central memory spaces for the doubly linked transaction data structure further includes storing transactions into transaction data structure elements, each of said transaction data structure elements including a LTNKCHART field, storing an associated LiNK vector element sequential number, each element of the LINK vector being a central memory address of the trial balance data structure elements.

41. A computer readable medium encoded with software, that when executed by a processor, causes the processor to carry out a process for building financial statements, the process comprising:

receiving accounting data file having a plurality of amounts, wherein each amount has an accounting direction and a corresponding account;

processing an account balance resulting from one or more transactions, and each transaction is associated with more than one account and combines at least one debit and at least one manually grouping the accounts from a user display into one or more financial statement items, wherein each account is associated with only one financial statement item within any one financial statement and wherein said grouping is regardless of an account sequence;

computing a financial statement item balance for each financial statement item based on the associated accounts and their respective account balances;

manually grouping the financial statement items from said user display into one or more totals, wherein each total is based on preceding financial statement item balances; and providing a financial statement that includes each financial statement item and its respective balance.

42. A computer readable medium encoded with software, that when executed by a processor, causes the processor to carry out a process for building financial statements, the process comprising:

receiving accounting data from an electric file having a plurality of amounts, wherein each amount has an accounting direction and a corresponding account;

processing an account balance resulting from one or more transactions, and each transaction is associated with more than one account and combines at least one debit and at least one credit;

manually grouping the accounts from a user display into one or more financial statement items, wherein each account is associated with only one financial statement item within any one financial statement and wherein said grouping is regardless of an account sequence;

computing a financial statement item balance for each financial statement item based on the associated accounts and their respective account balances;

storing the financial statement items into a financial statement data structure, the financial statement data structure including a LINE type field for each line of a financial statement, each LINE type field specifying a type attributed to the corresponding financial statement line, with the types including a financial statement item type to designate financial statement items and a total type to designate financial statement items manually grouped from said user display into a total; and providing the financial statement that includes each financial statement item and its respective balance.

43. A computer readable medium encoded with software, that when executed by a processor, causes the processor to carry out a process for building financial statements, the process comprising:

receiving accounting data having a plurality of amounts, wherein each amount has an accounting direction and a corresponding account;

processing an account balance resulting from one or more transactions, and each transaction is associated with more than one account and combines at least one debit and at least one credit;

dynamically allocating central memory spaces for a trial balance data structure for storing the accounts of the accounting data, and linking elements of the trial balance data structure with a doubly linked list of pointers thereby allowing manual grouping of the accounts from a user display into financial statement items using sub-lists of pointers, wherein each account is associated with only one financial statement item within any one financial statement and wherein said grouping is regardless of an account sequence; manually grouping the accounts from said user display into one or more financial statement items;

computing a financial statement item balance for each financial statement item based on the associated accounts and their respective account balances; dynamically allocating central memory spaces for a financial statement data structure for storing the financial statement items, and linking elements of the financial statement data structure with a doubly linked list of pointers thereby allowing manual grouping of financial statement items from said user display into totals using sub-list of pointers;

manually grouping the financial statement items from said user displays into one or more totals, wherein each total is based on preceding financial statement items balances; and providing a financial statement that includes each financial statement item and its respective balance.

44. A computer readable medium encoded with software, that when executed by a processor, causes the processor to carry out a process for organizing accounting data in data structures used for building financial statements, the process comprising:

receiving accounting data, the accounting data including a plurality of amounts, wherein each amount has an accounting direction and an account;

dynamically allocating central memory spaces for a trial balance data structure for storing accounts included in the accounting data, and linking elements of the trial balance data structure with a doubly linked list of pointers thereby allowing manual grouping of the accounts from a user display into financial statement items using sub-lists of pointers, wherein each account is associated with only one financial statement item within any one financial statement and has a computed account balance resulting from one or more transactions, and each transaction is associated with more than one account and combines at least one debit and at least one credit and wherein said grouping is regardless of an account sequence;

manually grouping the accounts from said user display into one or more financial statement items;

dynamically allocating central memory spaces for a financial statement data structure for storing the financial statement items, and linking elements of the financial statement data structure with a doubly linked list of pointers thereby allowing manual grouping of financial statement items from said user display into totals using sub-lists of pointer;

manually grouping the financial statement items from said user display into one or more totals, wherein each total is based on preceding financial statement items balances; storing financial statement items into the financial statement data structure, the financial statement data structure including a LINE type field for each line of a financial statement, each LINE type field specifying a type attributed to the corresponding financial statement line, the types including a financial statement item type and a total type; and providing a financial statement that includes each financial statement items and its respective balance.

\* \* \* \* \*

UNITED STATES PATENT AND TRADEMARK OFFICE
CERTIFICATE OF CORRECTION

PATENT NO. : 7,139,729 B2
APPLICATION NO. : 09/736345
DATED : November 21, 2006
INVENTOR(S) : Nault It is certified that error appears in the above--identified patent and that said Letters Patent is hereby corrected as shown below:

Column 23, line 7: please replace "elected" with --selected--

Column 25, line 67 (claim 17): please replace "LiNE" with --LINE--

Column 26, line 33 (claim 23): please replace "L1NKCHART" with --LINKCHART--

Column 26, line 34 (claim 23): please replace "LiNK" with --LINK--

Column 26, line 61 (claim 28): please delete "an electronic file ci"

Column 27, line 54 (claim 29): please replace "frouping" with --grouping--

Column 27, line 57 (claim 29): please start a new paragraph after "and"

Column 28, line 43 (claim 36): please replace "LiNK" with --LINK--

Column 29, line 38 (claim 40): please replace "LTNKCHART" with --LINKCHART--

Column 29, line 39 (claim 40): please replace "LiNK" with --LINK--

Column 29, line 46 (claim 41): please replace "receiving accounting data file" with --receiving accounting data--

Column 29, line 52 (claim 41): please insert --credit-- after "at least one"

Column 30, line 5 (claim 42): please delete "from an electric file"

Column 30, line 51 (claim 43): please start a new paragraph after "an account sequence;"

Column 30, line 56 (claim 43): please start a new paragraph after "respective account balances;"

Column 32, line 14 (claim 44): please start a new paragraph after "financial statement items balances;"

Signed and Sealed this

Twenty-seventh Day of April, 2010

David J. Kappos
*Director of the United States Patent and Trademark Office*

Column 32, line 20 (claim 44): please start a new paragraph after "and a total type; and"